US007883995B2

(12) United States Patent
Mitchell et al.

(10) Patent No.: US 7,883,995 B2
(45) Date of Patent: Feb. 8, 2011

(54) METHOD OF FORMING STABLE FUNCTIONALIZED NANOPARTICLES

(75) Inventors: Brian S. Mitchell, New Orleans, LA (US); Mark J. Fink, New Orleans, LA (US); Andrew S. Heintz, New Orleans, LA (US)

(73) Assignee: The Administrators of the Tulane Educational Fund, New Orleans, LA (US)

( * ) Notice: Subject to any disclaimer, the term of this patent is extended or adjusted under 35 U.S.C. 154(b) by 430 days.

(21) Appl. No.: 12/131,718

(22) Filed: Jun. 2, 2008

(65) Prior Publication Data
US 2009/0047773 A1 Feb. 19, 2009

Related U.S. Application Data

(60) Provisional application No. 60/932,428, filed on May 31, 2007.

(51) Int. Cl.
*H01L 21/00* (2006.01)
(52) U.S. Cl. ...................................... 438/478; 438/800
(58) Field of Classification Search .................. 438/478, 438/800; 451/32
See application file for complete search history.

(56) References Cited

U.S. PATENT DOCUMENTS

| 5,702,060 A | 12/1997 | Matteazzi et al. |
| 6,132,801 A | 10/2000 | Linford |
| 6,444,009 B1 | 9/2002 | Liu et al. |
| 7,371,666 B2 | 5/2008 | Swihart et al. |
| 2005/0267345 A1 | 12/2005 | Korgel et al. |

FOREIGN PATENT DOCUMENTS

KR 10-2003-0085746 A 11/2003

OTHER PUBLICATIONS

Castro et al., "Nanoparticles from Mechanical Attrition", Chap. 1 of Synthesis, Functionalization and Surface Treatment of Nanoparticles, 2002, American Scientific Publishers.
A.S. Heintz, M.J. Fink, B.S. Mitchell, "Mechanochemical Synthesis of Blue Luminescent Alkyl/Alkenyl-Passivated Silicon Nanoparticles", Adv. Mater., 2007, 3984-88, vol. 19.
Mayeri, Daniel et al., NMR Study of the Synthesis of Alkyl-Terminated Silicon Nanoparticles from the Reaction of SiCl4 with the Zintl Salt, NaSi, Chem. Mater., 2001, vol. 13, pp. 765-770.

*Primary Examiner*—Evan Pert
(74) *Attorney, Agent, or Firm*—Garvey, Smith, Nehrbass & North, L.L.C.; Seth M. Nehrbass; Charles C. Garvey, Jr.

(57) ABSTRACT

A novel top-down procedure for synthesis of stable passivated nanoparticles uses a one-step mechanochemical process to form and passivate the nanoparticles. High-energy ball milling (HEBM) can advantageously be used to mechanically reduce the size of material to nanoparticles. When the reduction of size occurs in a reactive medium, the passivation of the nanoparticles occurs as the nanoparticles are formed. This results in stable passivated silicon nanoparticles. This procedure can be used, for example in the synthesis of stable alkyl- or alkenyl-passivated silicon and germanium nanoparticles. The covalent bonds between the silicon or germanium and the carbon in the reactive medium create very stable nanoparticles.

20 Claims, 23 Drawing Sheets

5 nm

METHOD OF FORMING STABLE FUNCTIONALIZED NANOPARTICLES

CROSS-REFERENCE TO RELATED APPLICATIONS

Priority of U.S. Provisional Patent Application Ser. No. 60/932,428, filed 31 May 2007, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to methods for the mechanochemical preparation of stable passivated nanoparticles, made of e.g. silicon or germanium.

2. General Background of the Invention

A nanoparticle (or nanopowder) is a microscopic particle with at least one dimension less than 100 nanometer (nm). Nanoparticles have recently been at the forefront of biomedical, optical, and electronics research because they can exhibit fundamentally new behavior when their sizes fall below the critical length scale associated with any given property. A bulk material is generally considered to have uniform physical properties throughout regardless of its size, but at the nano-scale the properties of materials change as the percentage of atoms at the surface of the material becomes significant. Below the micrometer scale, size-dependent properties are observed such as quantum confinement in semiconductor particles, surface plasmon resonance in some metal particles, and supermagnetism in magnetic materials.

Quantum confinement occurs when electrons and holes in a semiconductor are restricted in one or more dimensions. A quantum dot is confined in all three dimensions, a quantum wire is confined in two dimensions, and a quantum well is confined in one dimension. That is, quantum confinement occurs when one or more of the dimensions of a nanocrystal is made very small so that it approaches the size of an exciton in bulk crystal, called the Bohr exciton radius. An exciton is a bound state of an electron and an imaginary particle called an electron hole in an insulator or semiconductor. An exciton is an elementary excitation, or a quasiparticle of a solid. A quantum dot is a structure where all dimensions are near the Bohr exciton radius, typically a small sphere. A quantum wire is a structure where the height and breadth is made small while the length can be long. A quantum well is a structure where the height is approximately the Bohr exciton radius while the length and breadth can be large. Quantum confinement effects at very small crystalline sizes can cause silicon and germanium nanoparticles to fluoresce, and such fluorescent silicon and germanium nanoparticles have great potential for use in optical and electronic systems as well as biological applications.

Silicon and germanium nanoparticles may be used, e.g., in optical switching devices, photovoltaic cells, light emitting diodes, lasers, and optical frequency doublers, and as biological markers.

The photoluminescence (PL) mechanism in silicon and germanium nanoparticles is also influenced by the nature and bonding state of the particle surface. Photoluminescence is a process in which a chemical compound absorbs photons (electromagnetic radiation), thus transitioning to a higher electronic energy state, and then radiates photons back out, returning to a lower energy state. The period between absorption and emission is typically extremely short, on the order of 10 nanoseconds. Under special circumstances, however, this period can be extended into minutes or hours. Ultimately, available chemical energy states and allowed transitions between states (and therefore wavelengths of light preferentially absorbed and emitted) are determined by the rules of quantum mechanics. A basic understanding of the principles involved can be gained by studying the electron configurations and molecular orbitals of simple atoms and molecules. More complicated molecules and advanced subtleties are treated in the field of computational chemistry.

Light absorption and emission in a semiconductor are known to be heavily dependent on the detailed band structure of the semiconductor. Direct band gap semiconductors are semiconductors for which the minimum of the conduction band occurs at the same wave vector, k, as the maximum of the valence band. Direct band gap semiconductors have a stronger absorption of light as characterized by a larger absorption coefficient and are also the favored semiconductors when fabricating light emitting devices. Indirect band gap semiconductors are semiconductors for which the minimum of the conduction band does not occur at the same wave vector as the maximum of the valence band. Indirect band gap semiconductors are known to have a smaller absorption coefficient and are rarely used in light emitting devices.

This striking difference between direct band gap semiconductors and indirect band gap semiconductors can be explained by the energy and momentum conservation required in the electron-photon interaction. The direct band gap semiconductor has a vertically aligned conduction and valence band. Absorption of a photon is obtained if an empty state in the conduction band is available for which the energy and momentum equals that of an electron in the valence band plus that of the incident photon. Photons have little momentum relative to their energy since they travel at the speed of light. The electron therefore makes an almost vertical transition on the E-k diagram. For an indirect band gap semiconductor, the conduction band is not vertically aligned to the valence. Therefore a simple interaction of an incident photon with an electron in the valence band will not provide the correct energy and momentum corresponding to that of an empty state in the conduction band. As a result absorption of light requires the help of another particle, namely a phonon.

A phonon is a particle associated with lattice vibrations and has a relatively low velocity close to the speed of sound in the material. Phonons have a small energy and large momentum compared to that of photons. Conservation of both energy and momentum can therefore be obtained in the absorption process if a phonon is created or an existing phonon participates. The minimum photon energy that can be absorbed is slightly below the band gap energy in the case of phonon absorption and has to be slightly above the band gap energy in the case of phonon emission. Since the absorption process in an indirect band gap semiconductor involves a phonon in addition to the electron and photon, the probability of having an interaction take place involving all three particles will be lower than a simple electron-photon interaction in a direct band gap semiconductor. As a result one finds that absorption is much stronger in a direct band gap material. Similarly, in the case of light emission, a direct band gap material is also more likely to emit a photon than an indirect band gap material. While indirect band gap materials are occasionally used for some LEDs, they result in a low conversion efficiency. Direct band gap materials are used exclusively for semiconductor laser diodes.

The presence of oxygen at a silicon surface has been shown to have deleterious effects on luminescence properties. In a study conducted in 1999 at the University of Rochester, scientists hypothesized that oxygen at the surface of a porous silicon (PSi) nanoparticle diminished photoluminescence. PSi samples with varying porosities were kept at room temperature in either Argon (Ar) atmosphere or air. Investigating the evolution of the chemical coverage of an Ar-stored sample as it was exposed to air, researchers discovered through Fourier Transform Infrared Spectrometry (FTIR) analysis that hydrogen-passivated PSi samples that initially showed no sign of oxygen absorption showed Si—O—Si peaks in as little as 3 minutes after exposure to air. After 24 hours, the Si—H peaks disappeared and the Si—O—Si and Si—O—H peaks dominated spectra. When the samples were exposed to air for longer than 200 minutes, no significant change in the Si—O—Si and Si—O—H peaks was observed, indicating stabilization of the surface chemical coverage. As the surface passivation was gradually changing, the PL was redshifted. It was concluded that both porosity (or size) and chemical coverage dictate the recombination mechanism. The results suggest that the electron-hole recombination in samples exposed to oxygen occurs via carriers trapped in oxygen-related localized states that are stabilized by the widening of the gap induced by quantum confinement.

Surface modification of nanoparticles with alkyl groups has been demonstrated by chemical reactions on Si—H and Si-Halide capped surfaces but with limited success. Although PL is initially preserved, incomplete alkylation by these two-step techniques ultimately leads to non-uniform coverage and instability with respect to oxidation. Given the high affinity of silicon for oxygen, it is therefore necessary to utilize a particle surface passivation technique that can be conducted in an oxygen-free environment and that facilitates direct interaction of the alkyl groups with surface silicon atoms.

Current methods of Si—C bond formation on silicon surfaces involve either the use of a well-defined clean silicon surface maintained under ultrahigh vacuum conditions, the use of chemical or electrochemical etching of the silicon surface, or the Wurtz reaction of halosilanes. Wet chemistry approaches, such as those requiring use of hydrogen fluoride etches or condensation of halosilanes, involve unstable hydrogen- or halogen-terminated surface intermediates and the use of corrosive or toxic chemicals. Similarly, current direct reaction methods involve the use of expensive equipment and may be difficult to scale. These direct approaches, commonly involving the mechanical scribing of silicon in the presence of reactive organic reagents, have found success in the patterning of silicon surfaces through reaction of a freshly exposed surface with the organic reagent. These techniques are limited to large and regular surfaces and are not practical for use with nanoparticles.

Niederhauser et al. of Brigham Young University in Provo, Utah developed a method for preparing alkyl monolayers on silicon, which consists of cleaning a silicon wafer to remove adventitious contaminants from its surface, leaving its thin native oxide layer, wetting the dry surface of the clean silicon with an unsaturated, organic molecule, mechanically scribing the silicon with a diamond-tipped instrument while it is wet with the unsaturated, organic liquid, and cleaning the scribed surface to remove excess organic liquid and silicon particles that are produced by scribing. Their process is the first known to use wet-chemical preparation of monolayers on silicon that does not require a hydrogen-terminated silicon intermediate.

Current methods of silicon surface functionalization, including Niederhauser's, have numerous shortcomings. Niederhauser's approach is applicable only to flat surfaces. Even those processes that apply to the formation of functionalized silicon nanoparticles require multistep processes involving the use of corrosive or toxic reagents or potentially explosive reaction conditions. The initially formed silicon nanoparticles typically result from the reduction of silicon halides, the thermal or laser decomposition of silanes, the oxidation of metal silicides, or the electrochemical etching of bulk silicon. Each procedure uses either a corrosive or very reactive reagent and the initially formed nanoparticles are highly reactive due to hydrogen or halide terminated surfaces.

There is a need for simple, direct methods of producing stable passivated silicon nanoparticles. The present invention meets this need by providing a simple one-step process for the formation and passivation of a silicon surface under very mild conditions. In addition, the process does not need to involve additional solvent and can be conducted on a continuous basis. This process constitutes a novel method of producing stable passivated silicon nanoparticles that do not exhibit the shortcomings of any of the existing methods, yet provide the novel aspects of quantum confinement effects.

The following references, and all references mentioned herein, are incorporated herein by reference:

U.S. Pat. No. 7,371,666 entitled "Process for producing luminescent silicon nanoparticles";

U.S. Pat. No. 6,132,801 entitled "Producing Coated Particles by Grinding in the Presence of Reactive Species" and which uses a mortar and pestle in a controlled dry box (see column 5, lines 37-61);

U.S. Pat. No. 5,702,060 entitled "High-Energy High-Capacity Oscillating Ball Mill";

U.S. Pat. No. 6,444,009 entitled "Method for producing environmentally stable reactive alloy powders"; and Castro et al., "Nanoparticles from Mechanical Attrition", Chapter 1 of *Synthesis, Functionalization and Surface Treatment of Nanoparticles*, (American Scientific Publishers 2002).

The present inventors are aware of references which discuss ball milling of silicon to produce nanoparticles; however, to the knowledge of the present inventors none of these references discuss simultaneous formation of nanoparticles and passivation of the nanoparticles with a reactive medium.

BRIEF SUMMARY OF THE INVENTION

The present invention relates to methods of producing stable passivated nanoparticles through mechanical size reduction of material (such as a semiconductor such as silicon or germanium) in the presence of a reactive medium.

A preferred embodiment of the present invention relates to methods of producing stable passivated semiconductor nanoparticles through high energy ball milling of material (such as silicon or germanium) in the presence of a reactive liquid or gaseous medium.

The present invention provides a method of forming stable, functionalized nanoparticles, comprising the steps of: providing a first material, providing a reactive liquid or gaseous medium, and ball milling the first material in the reactive liquid or gaseous medium to provide ball milled nanoparticles. The method includes the use of a reactive liquid or gaseous medium that is selected from the group including: alcohols, aldehydes, alkynes, alkenes, amines, azides, carboxylic acids, ketones, nucleic acids, and solutions of peptides and proteins. In the preferred method, the first material possesses semi-conductive properties. The method can include ball milling with a high energy ball mill.

The method can include ball milling as a batch operation. The method can include ball milling as a continuous operation. In the preferred method, the functionalized nanoparticles exhibit size-dependent quantum confinement effects including photoluminescence.

The functionalized nanoparticles are soluble in organic solvents, including but not limited to a reactive medium. In the preferred method, the functionalized nanoparticles are soluble in aqueous systems, including but not limited to the reactive medium.

In the preferred method, the reactive medium contains polyfunctional molecules including but not limited to dicarboxylic acids and diols such that the polyfunctionalized nanoparticles are further reactive.

In the preferred method, the polyfunctionalized nanoparticles are covalently linked together.

In the preferred method, the polyfunctionalized nanoparticles are covalently linked to other materials including proteins, fullerenes, carbon nanotubes, or other materials. In the preferred method, the first semi-conducting material is altered from an indirect band gap semi-conductor to a direct band gap semi-conductor through high energy ball milling.

In the preferred method, the functionalized nanoparticles can be size-separated by use of gel permeation chromatography or a selective precipitation including but not limited to solvents such as for example, methanol and super-critical carbon dioxide.

In the preferred method, the functionalized nanoparticles exhibit strong covalent linkages between the first material and the reactive medium.

The method of the present invention forms stable nanoparticles. The method includes providing a first material, providing a reactive liquid or gaseous medium, ball milling the first material in the reactive liquid or gaseous medium to provide a liquid phase and a solid phase. The liquid phase preferably contains nanoparticles.

In accordance with an embodiment of the present invention, a stainless steel milling vial is loaded under inert atmosphere with chunks of single-crystal silicon and the reactive organic liquid of choice. Stainless steel milling balls are added to the vial, which is then sealed and subjected to HEBM. Ongoing ball-ball and ball-wall impacts during milling impart mechanical energy into the system, and silicon pieces trapped in these collisions fracture, reducing particle size and creating fresh surface. This newly created surface is highly reactive and provides sites for direct reaction between the silicon and the reactive organic, resulting in the formation of covalent bonds. As HEBM continues, silicon particle sizes are reduced into the nano-domain via comminution, and the direct surface reaction continues as fresh surface is continually produced via facture. In all cases, regardless of the reactive media, milling is preferably performed for a continuous period of 24 hours.

An advantage of the present invention, in addition to producing stable, functionalized nanoparticles in a single mechanochemical step, is that the liquid phase produced by the single mechanochemical step separates the nanoparticles of interest from the larger particles by solubalizing these nanoparticles in the liquid phase. Thus, the present invention inherently includes a separation technique for the size of particles (nanoparticles) which are of interest from those larger ones which are not of interest.

The present invention includes a method of forming stable functionalized nanoparticles, comprising providing a first material; providing a reactive medium; and reducing, in the reactive medium, the first material to particles having dimensions of no greater than 100 nm in size, the reactive medium functionalizing the particles in the first material as the particles are formed to provide stable functionalized nanoparticles. Preferably, the first material is mechanically reduced to nanoparticles. Preferably, ball milling is used to mechanically reduce the first material to nanoparticles, though impactors, for example, can instead used to mechanically reduce the first material to nanoparticles. Preferably, the particles have dimensions of no greater than 50 nm. More preferably, the particles have dimensions of no greater than 20 nm. Sometimes, it is preferable that the particles have dimensions of no greater than 5 nm.

The present invention also includes a method of mechanochemically making stable functionalized nanoparticles, comprising providing a first material; providing a reactive medium; and repeatedly mechanically impacting the first material in the presence of the reactive medium until a desired quantity of nanoparticles is produced, wherein the reactive medium reacts with the first material as the nanoparticles are produced to functionalize the nanoparticles.

The present invention includes a method of forming stable functionalized nanoparticles, comprising providing a first material; providing a reactive medium; and ball milling said first material in said reactive medium to provide ball milled nanoparticles.

The present invention includes a method of forming stable functionalized nanoparticles, comprising providing a first material; providing a reactive medium; ball milling said first material in said reactive medium to provide a fluid phase; and wherein in step "c" the fluid phase contains nanoparticles. Usually, the ball milling also produces a solid phase.

The reactive medium can be selected from the group consisting of: alcohols, aldehydes, alkynes, alkenes, amines, carboxylic acids, nucleic acids, and solutions of peptides and proteins, azides, ketones, epoxides, amides, esters, amino acids, organic halides, thiols, and carbohydrates, for example. Typically, the reactive medium is liquid or gaseous. Usually, the reactive medium is pure liquid, though the reactive medium can comprise a solution. Also, the reactive medium can comprise a supercritical fluid solution. Preferably, the functionalization is passivation.

Advantageously, the first material is at least one from the group consisting of silicon, germanium, doped silicon, doped germanium, alloys of Si and Ge, and binary silicon compounds; the binary silicon compounds can comprise silicon carbide and/or silicon nitride. Preferably, the first material possesses semiconductive properties; preferably, the first material is a semiconductor.

Preferably, the nanoparticles possess at least one property from the group consisting of: semiconductive, magnetic, radioactive, conductive, and luminescent properties. It might be advantageous for the nanoparticles to possess at least two properties from the group consisting of: semiconductive, magnetic, radioactive, conductive, and luminescent properties; the nanoparticles can possess phosphorescent and/or fluorescent properties. The nanoparticles can target certain cells in a living organism, such as by entering certain cells in a living organism. These cells can comprise cancer cells, endothelial cells and stem cells, for example. For example, the nanoparticles comprise can silicon passivated with hydrophilic groups that allow transport through a cell membrane.

The method nanoparticles can have properties which allow the nanoparticles to act as biological markers. The nanoparticles can comprise silicon passivated with hydrophilic groups that allow transport through a cell membrane. The nanoparticles can also comprise germanium passivated with hydrophilic groups that allow transport through a cell membrane. The nanoparticles can also comprise germanium passivated with hydrophilic groups that allow transport through a cell membrane.

Preferably, the ball milling is high energy ball milling. The ball milling can be a batch operation or a continuous operation.

Preferably, the functionalized nanoparticles exhibit size-dependent quantum confinement effects including photoluminescence.

Preferably, the functionalized nanoparticles are soluble in organic solvents, including but not limited to the reactive medium.

Preferably, the functionalized nanoparticles are soluble in aqueous systems, including but not limited to the reactive medium.

Preferably, the functionalized nanoparticles are soluble in supercritical fluids, including but not limited to the reactive medium.

Preferably, the reactive medium contains polyfunctional molecules including but not limited to dicarboxylic acids and diols such that the polyfunctionalized nanoparticles are further reactive. The polyfunctionalized nanoparticles can be covalently linked together. The polyfunctionalized nanoparticles can be covalently linked to other materials including but not limited to proteins, fullerenes, carbon nanotubes, polymers, and monomers; the polymers can comprise condensation or radical-chain type polymers; the monomers can subsequently go through a separate polymerization step to yield a network of nanoparticles tethered together by polymer chains. Advantageously, one could further form a nanocomposite of a polymer matrix with nanoparticles covalently linked in the matrix. The condensation or radical-chain polymers can comprise, for example, polyamides, polyvinylcholoride, polyethylene, polypropylene, polyimides, or polyethers.

Preferably, the first material is altered from an indirect band gap semiconductor to a direct band gap semiconductor through high energy ball milling.

Preferably, the functionalized nanoparticles can be size separated by use of gel permeation chromatography or selective precipitation including but not limited to solvents such as supercritical carbon dioxide.

Preferably, the functionalized nanoparticles exhibit covalent linkages between the first material and the reactive medium.

Preferably, the functionalized nanoparticles exhibit strong covalent linkages between the first material and the reactive medium.

The present invention includes as well nanoparticles produced by the method of any prior claim.

Incorporated herein by reference is our journal article: "Mechanochemical Synthesis of Blue Luminescent Alkyl/Alkenyl-Passivated Silicon Nanoparticles", Adv. Mater. 2007, 19, 3984-3988 (November 2007—published online October 2007).

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
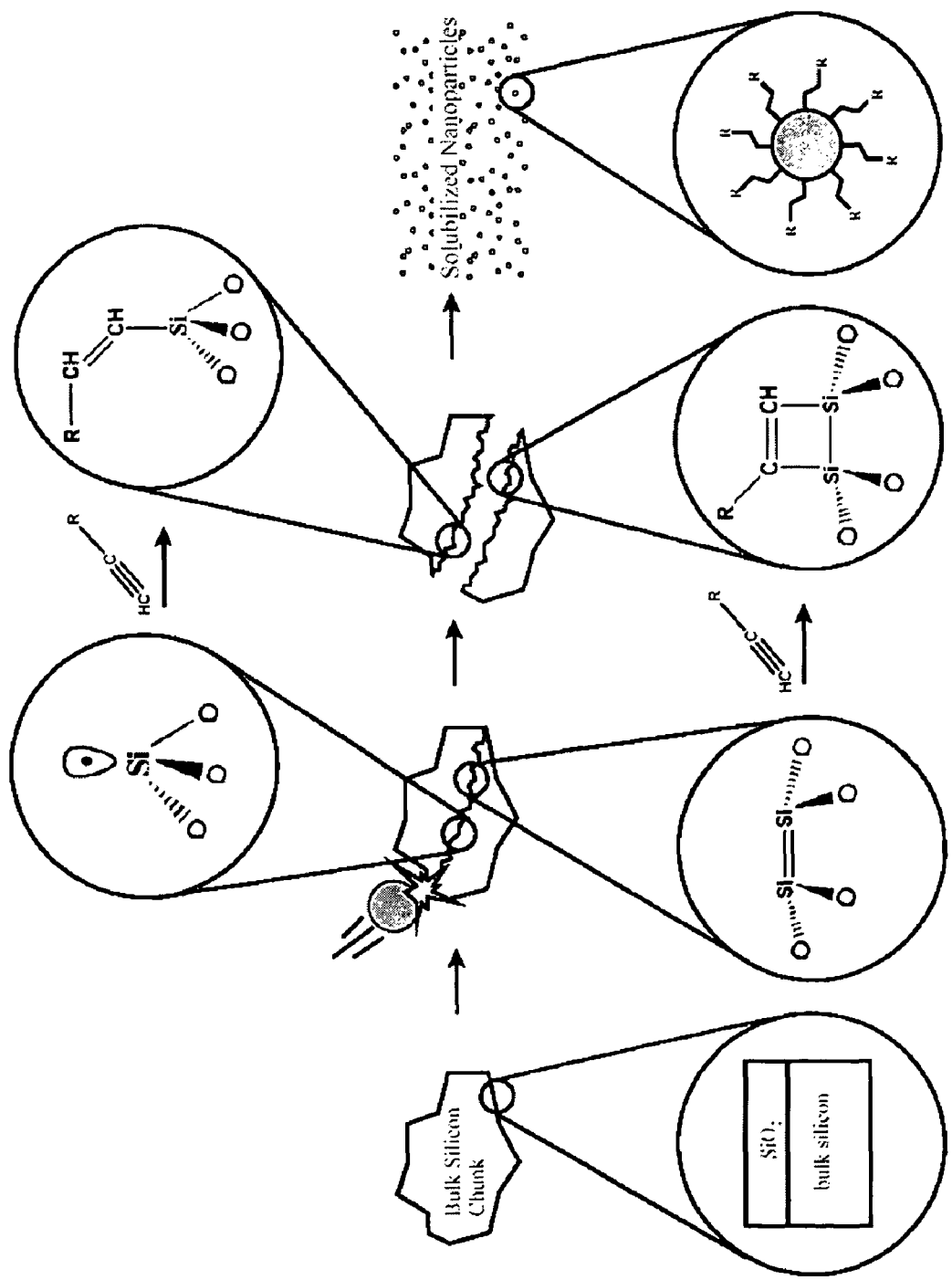
FIG. 1 is a schematic diagram that illustrates the overall procedure for production of alkyl-passivated silicon nanoparticles, according to the method of the present invention.

The present invention includes a novel procedure for synthesis of stable alkyl- or alkenyl-passivated silicon nanoparticles using high-energy ball milling. The high energy ball mill can be a SPEX-type mill. The impact energy for SPEX mills ranges within the intervals 0.023-0.084 J and 0.069-0.252 J for the 4 g and 12 g balls, respectively. High energy ball mills like the SPEX models have ball velocities of around 4 m/s, which translates to kinetic energy inputs of 0.012 J/hit or power inputs of 0.24 W/g-ball. SPEX type mills and stainless steel vials are commercially available (http://www.spexsp.com). The vials can be nylon vials made from Nylon 6/6 and of the same dimensions as the commercially available stainless steel vials. The main advantage of this mechanochemical approach is the simultaneous production of silicon nanoparticles and the chemical passivation of the particle surface by alkyl or alkenyl groups covalently linked through strong Si—C bonds.

This invention embodies a novel and successful method for the mechanochemical preparation of stable alkyl- or alkenyl-passivated silicon nanoparticles. This green chemistry approach achieves a direct alkylation of the fresh silicon surface without the assistance of an unstable hydrogen-terminated intermediate or the use of any corrosive or toxic chemicals. The nanoparticles produced are of notably small sizes for a top-down comminution method, as particles less than 10 nm have been observed. Such sizes are not readily achievable with traditional grinding techniques.

The exhibited blue fluorescence and obvious Stokes shift indicate that the nanoparticles are largely oxide-free. The nanoparticles prepared by this method have proven to be thermally-stable and maintain their fluorescence over periods of months. This method therefore provides a simple and effective way of producing alternatively passivated silicon nanoparticles.

The production of passivated silicon nanoparticles via high energy ball milling as described above is traditionally performed in a batch-wise method; i.e., the reactants are loaded in a vial, the process proceeds to completion in the closed container, and the products are removed. No material crosses an imaginary boundary surrounding the milling vial. The process can be made continuous, or non-batch-wise, by providing an input and output stream to the milling vial such that reactants and products continuously cross an imaginary boundary surrounding the milling vial.

After initial start-up, the process achieves steady state and a stream of passivated nanoparticles suspended in the reactive medium is continuously removed from the milling vial. The continuous production of functionalized nanoparticles in the proposed continuous mechanochemical attrition device can be modeled as a continuous stirred tank reactor (CSTR). For the CSTR, reactants flow in (solvent, coarse silicon chunks), and products flow out (solubilized silicon nanoparticles, solvent, and partially-functionalized silicon particles). The effluent stream would then need to go to a separation step; e.g., a continuous centrifuge, such that the partially-reacted particles are separated out as sludge, and the solvent with solubilized nanoparticles continues on to purification steps such as evaporation or concentration. A filter can be placed in the vial to minimize the removal of partially-reacted particles. In this way, most of the micron-scale particles will remain in the vial to undergo further comminution and functionalization.

The overall procedure for production of alkyl-passivated silicon nanoparticles is illustrated in FIG. 1. A milling vial loaded under inert atmosphere with non-spherical millimeter-sized (e.g. between about 0.5 microns-1.0 cm) pieces of semiconductor-grade silicon and either a reactive liquid or gaseous medium such as an alkene or alkyne. Stainless steel milling balls are added to the vial, which is then sealed and placed in the high-energy ball mill (e.g. SPEX Sample Prep 8000 Series high energy ball mill, www.spexsp.com). The milling balls are typically one half inch (1.27 cm) diameter. Other sizes are available. The diameters could be between about 1-50 mm. High energy ball milling (HEBM) utilizes ball velocities of around 4 m/s, which translate to kinetic energy inputs of 0.012 J/hit, or power inputs of 0.24 W/g-ball. Measured values of specific intensity for high energy ball milling have been reported in the range 0.2-1.2 W/g, which is much greater than that found in other types of mills such as rotary mills, or other comminutive processes such as grinding. The ongoing impacts and collisions of the milling balls (ball-ball and ball-wall impacts) during high energy ball milling impart a significant amount of mechanical energy to the system which cause the silicon pieces to fracture, thus reducing particle size and creating fresh silicon surface. The newly-created surface in high energy ball milling is highly reactive and provides sites for direct reaction between the silicon and the reactive medium, preferably and alkene or alkyne. The alkene or alkyne reacts with the silicon surface resulting in the formation of a covalent Si—C bond.

As high energy ball milling proceeds, particle sizes are reduced into the nano-domain, and the direct reaction continues with the large amount of resulting fresh surface. After high energy ball milling, the vial is allowed to sit undisturbed allowing any larger particles to settle leaving the functionalized nanoparticles in solution. This procedure has shown to be effective for both alkenes and alkynes. However, a higher reactivity of alkynes relative to alkenes over comparable milling times has shown that alkynes provide a higher yield of solubilized nanoparticles.

After sufficient milling, two primary phases are formed: the liquid hydrocarbon phase that now contains functionalized and solubilized nanoparticles, and a "sediment" phase that contains a variety of particles, including partially-functionalized and/or partially-comminuted particles. In the liquid hydrocarbon phase, the solvent can be easily removed, leaving a distribution of functionalized nanoparticles.

Figure 2:
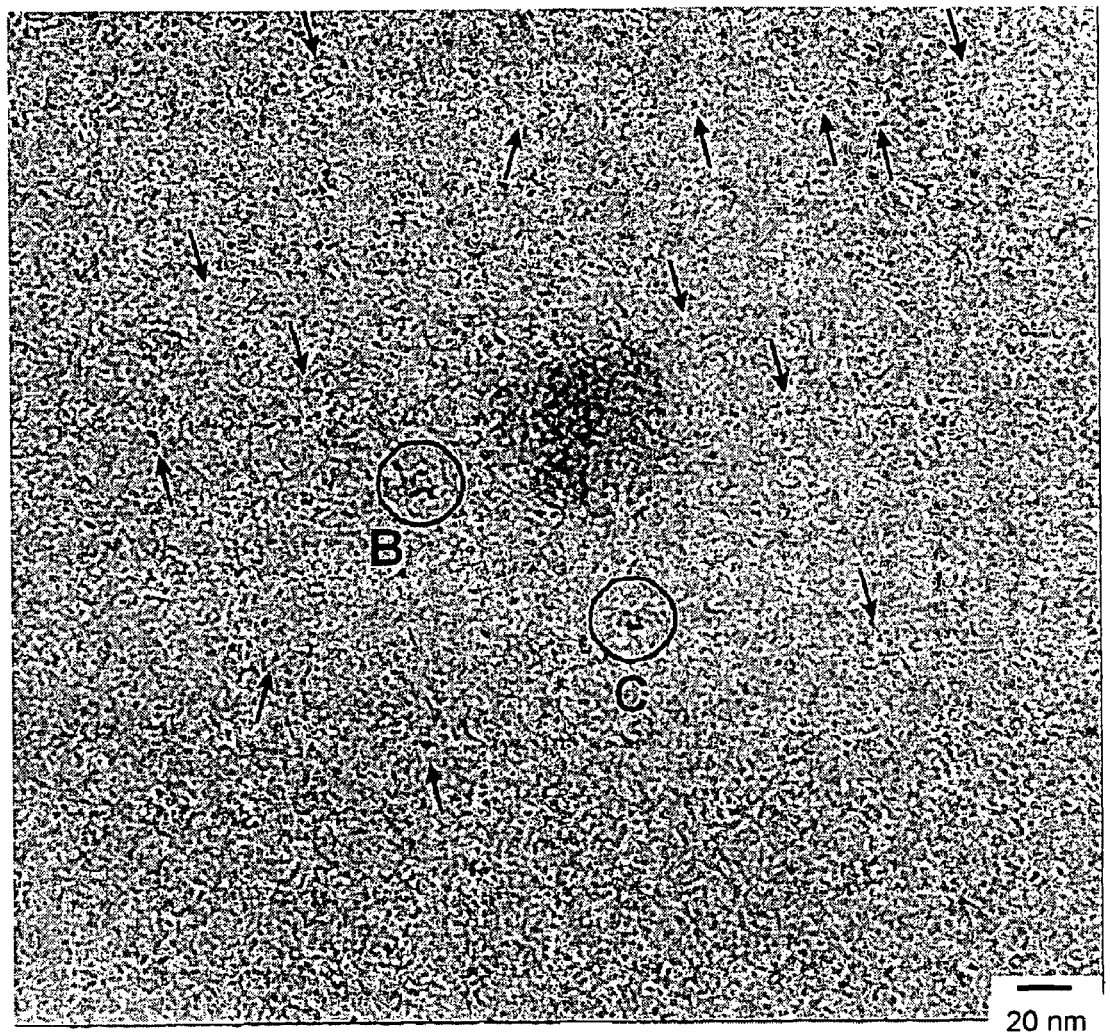
FIG. 2 is a transmission electron microscope (TEM) image obtained of suspended silicon nanoparticles produced by milling for twenty-four hours in 1-octyne, and wherein a number of nanoparticles are indicated by arrows in the image and can be seen with sizes ranging from 1-4 nm, with few particles in the range of 5-30 nm.
Figure 3:
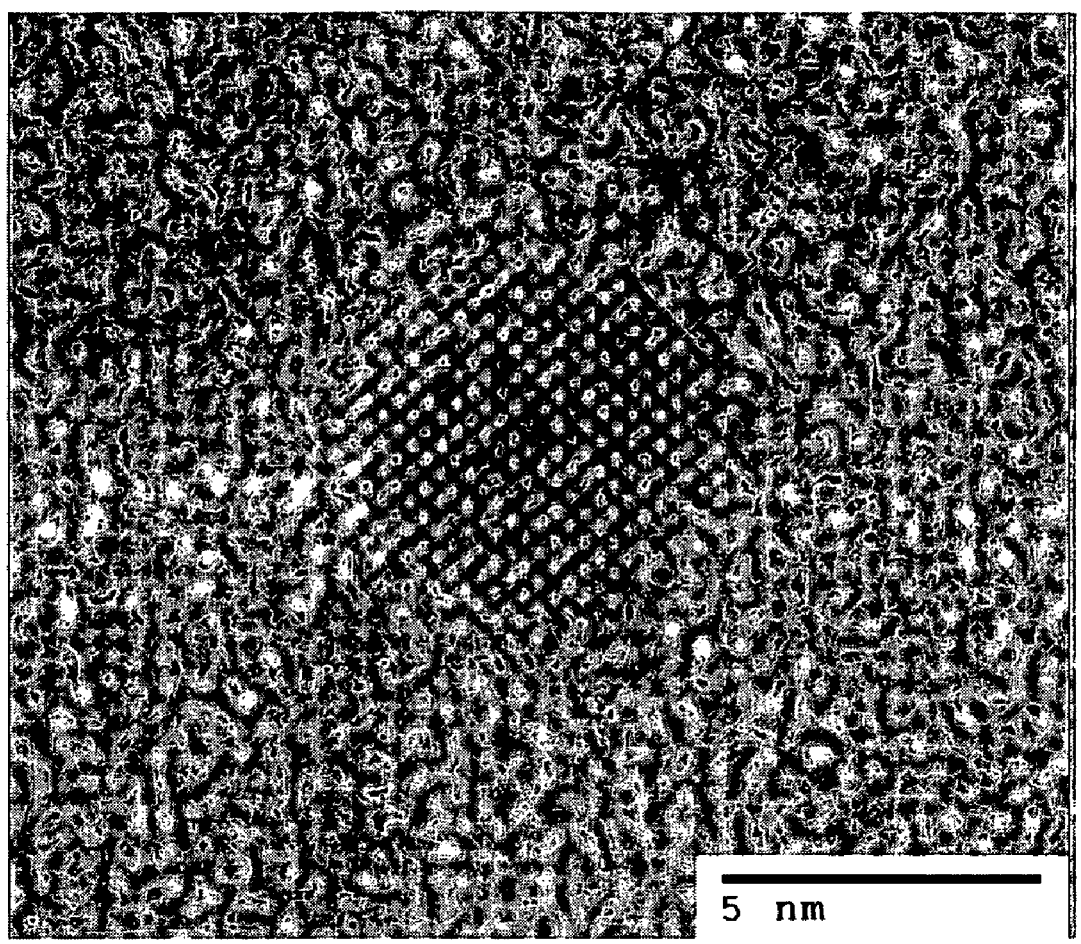
FIGS. 3 and 4 are enlargements of the two nanoparticles labeled "B" and "C" in FIG. 2, with a legend added to indicate scale.
Figure 4:
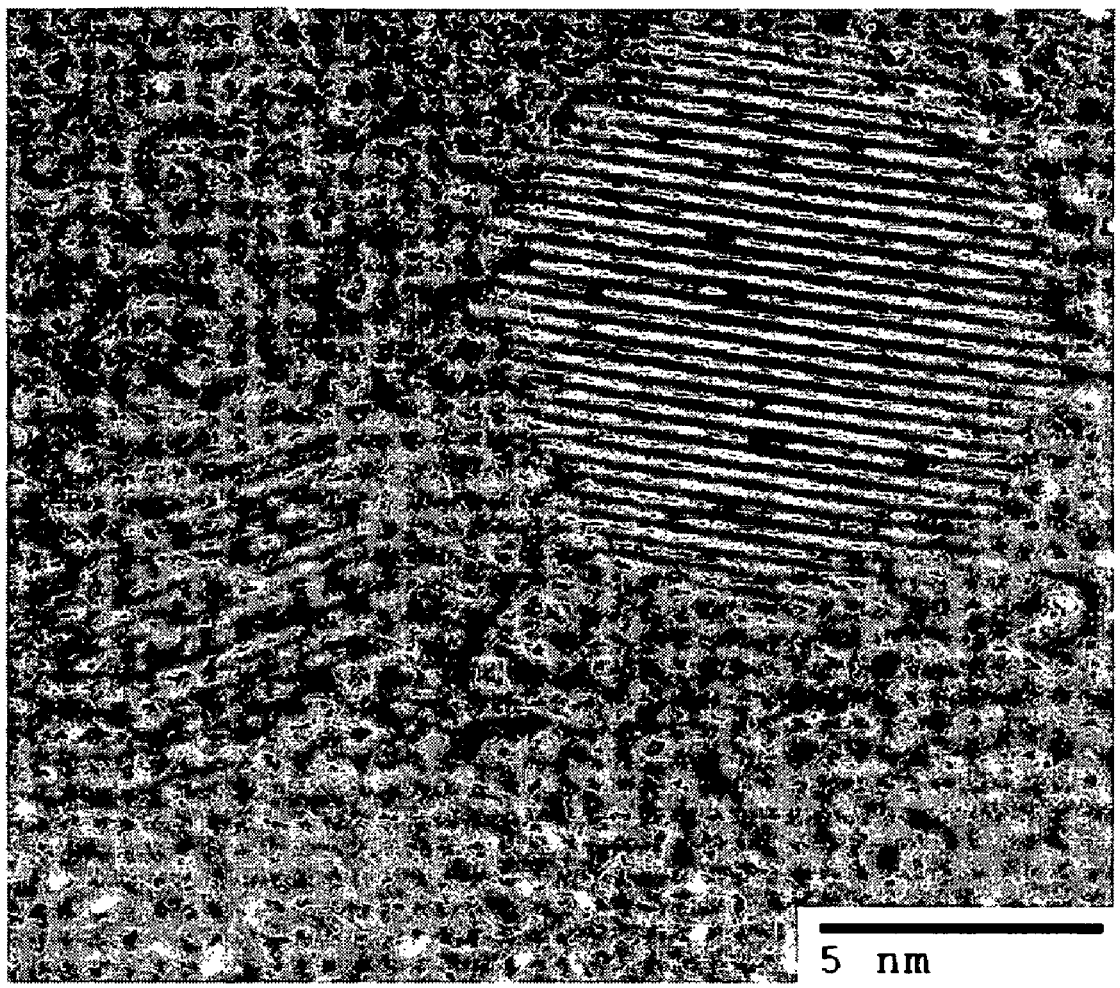

FIG. 2 is a transmission electron microscope (TEM) image obtained of suspended silicon nanoparticles produced by milling for 24 hours in 1-octyne. A number of nanoparticles can be seen with sizes ranging from 1-4 nm, with few particles in the range of 5 to 30 nm. The high-resolution TEM images in FIGS. 3 and 4 show individual single-crystal silicon particles with diameters of approximately 6 nm and 9 nm, respectively. However, the majority of nanoparticles in FIG. 2 are even smaller than this, demonstrating that nanoparticles are produced of notably small size for such a top-down method. Energy dispersive x-ray spectroscopy (EDS) spectra obtained in the nanoparticles in FIGS. 3 and 4 exhibit distinct peaks at 1.8 keV, confirming particle compositions as being silicon. In addition, EDS spectra displayed a lack of peak at 0.5 keV, indicating particles as being largely oxide-free.

Figure 5:
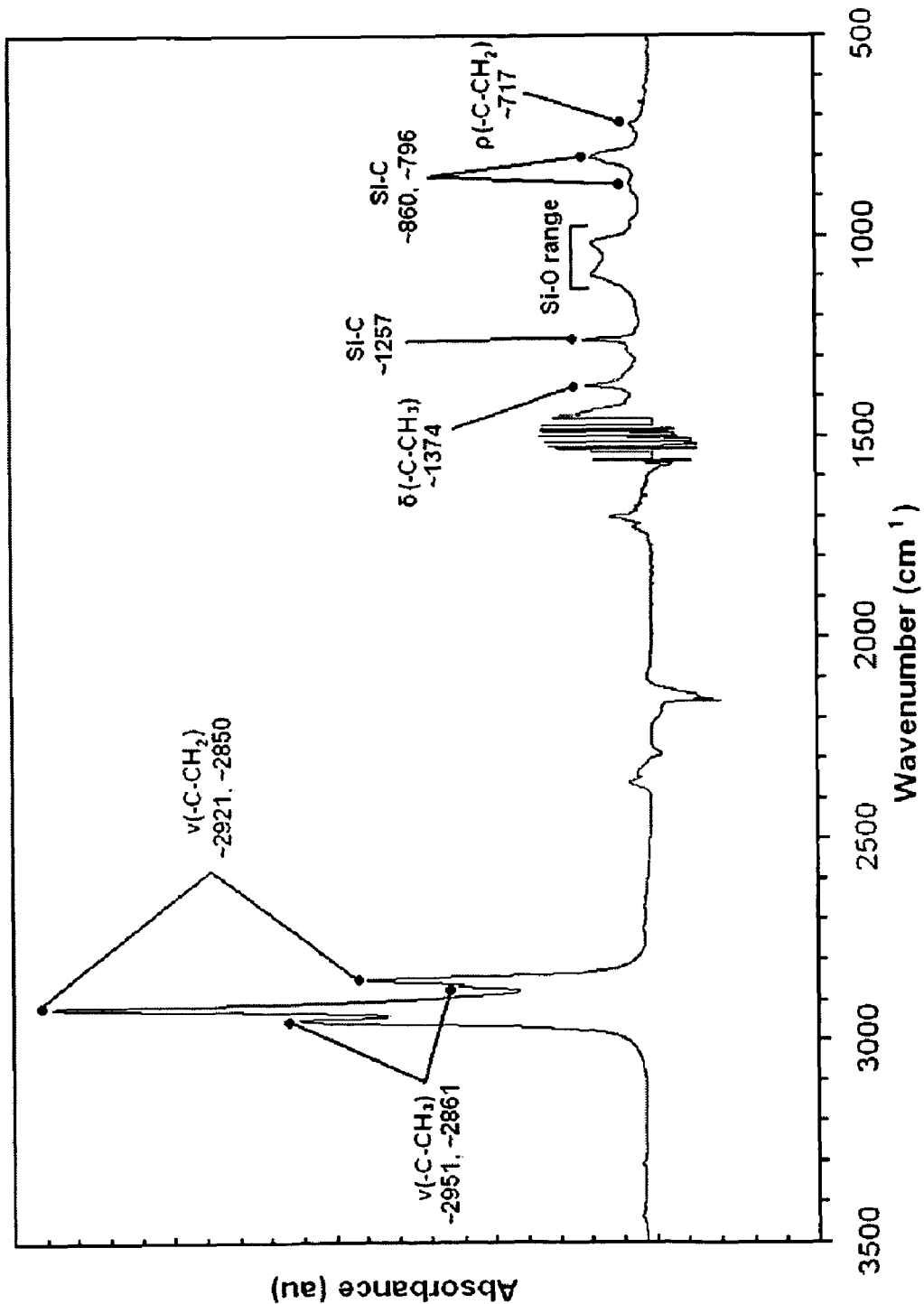
FIG. 5 shows a Fourier transform infrared spectrum obtained from silicon nanoparticles produced by milling for twenty-four hours in 1-octyne, and wherein for analysis, the nanoparticles were isolated from the milling solution by rotary evaporation, and were dissolved in carbon disulfide.

FIG. 5 shows a Fourier transform infrared (FTIR) spectrum obtained on silicon nanoparticles produced by milling for 24 hours in 1-octyne. For analysis, the nanoparticles were isolated from the milling solution by rotary evaporation, and were dissolved in carbon disulfide. Carbon disulfide was chosen as the solvent such that its absorption peaks spectrum would not interfere with those of the nanoparticles' spectrum.

The infrared spectrum shows clear evidence of an organic layer, as noted by the strong C—H stretching bands in the 2800-3000 $cm^{-1}$, as well as C—H vibrational modes at 1374 cm-1 and 717 $cm^{-1}$. The pronounced peaks and ~1257 $cm^{-1}$, ~806 $cm^{-1}$, and ~796 $cm^{-1}$ correspond to Si—C bonds, indicating that the 1-octyne is indeed bound covalently to the surface of the particle.

Figure 6:
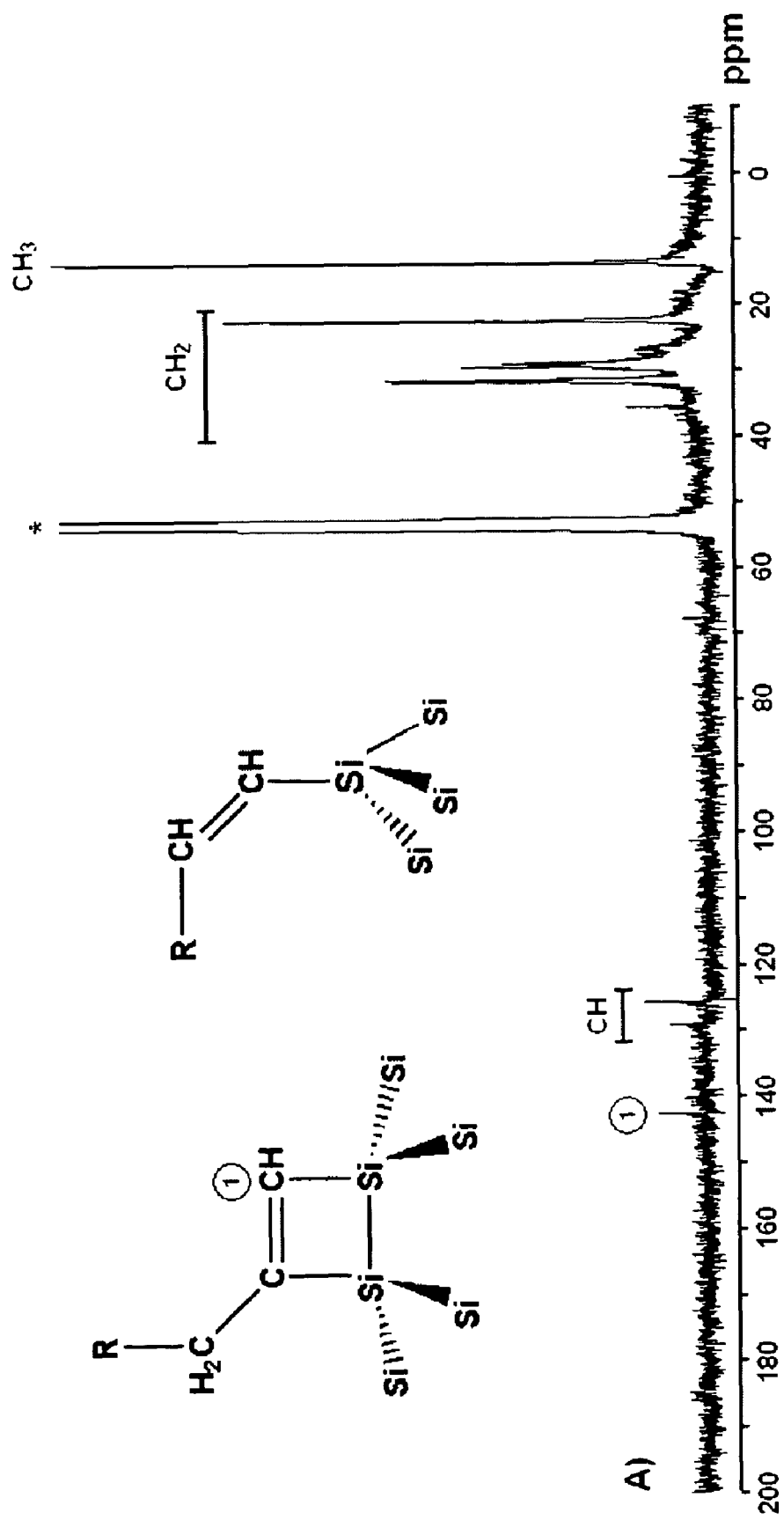
FIG. 6 shows a $^{13}C\{^{1}H\}$ NMR spectrum.
Figure 7:
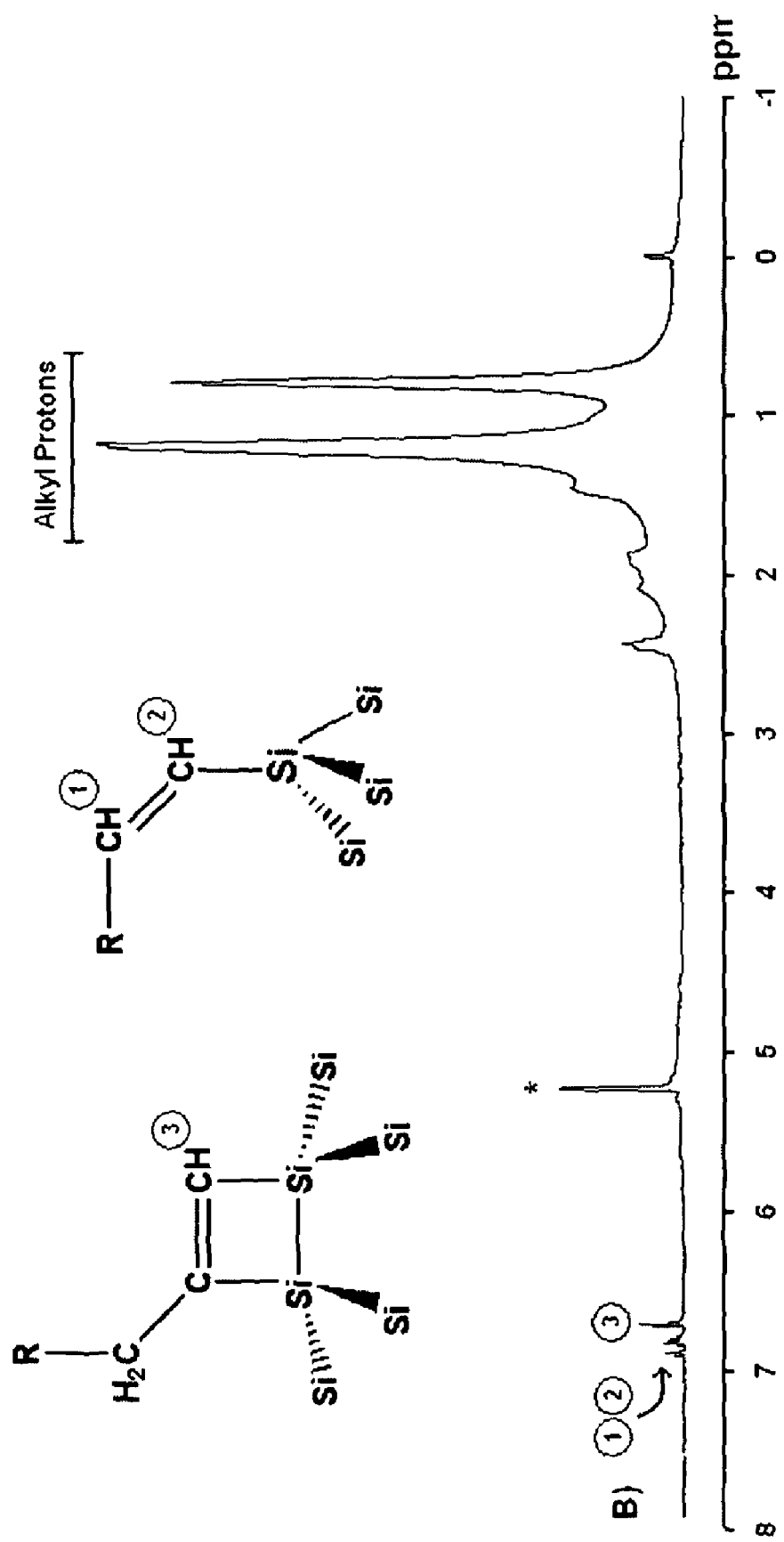
FIG. 7 shows an $^{1}H$ NMR spectrum, both obtained on prepared alkyl coated silicon nanoparticles isolated from the milling solvent and dispersed in methylene chloride-d.

Nuclear magnetic resonance spectroscopy (NMR) was used to provide further evidence of a covalently linked surface layer. FIG. 6 shows a $^{13}C$ {$^{1}H$}NMR spectrum and FIG. 7 shows an $^{1}H$ NMR spectrum, both obtained on prepared alkyl coated silicon nanoparticles isolated from the milling solvent and dispersed in methylene chloride-d. The assignment of CH multiplicities was determined by use of the multipulse distortionless enhancement by polarization (DEPT) sequence in a separate experiment. The $^{13}C$ spectrum of the nanoparticles clearly shows a uniformity of chemical environment for the alkyl chain, exhibiting a single methyl resonance and a distinct number of methylene chain carbons. Furthermore, three resonance peaks appear in the olefinic region of the spectrum at 125, 129, and 142 ppm. The olefinic CH carbons at 125 and 129 ppm and the quartenary carbon at 142 ppm suggest the formation of a silicon surface bond disilacyclobutene structure, resulting from the [2+2]cycloaddition of the alkyne to silicon dimer pairs at the surface. The $^{1}H$ NMR spectrum definitively shows alkyl resonances over the 0.5 to 2.5 ppm range due to the alkyl chain, as well as a singlet and AB quarter in the vinyl region of this spectrum. While the vinyl singlet supports the aforementioned disilaclobutene structure, the AB quartet implies the formation of a second bonding structure, in which the alkyl forms a surface bound linear structure due to hydrogen abstraction initiated by a silicon surface radical.

Figure 8:
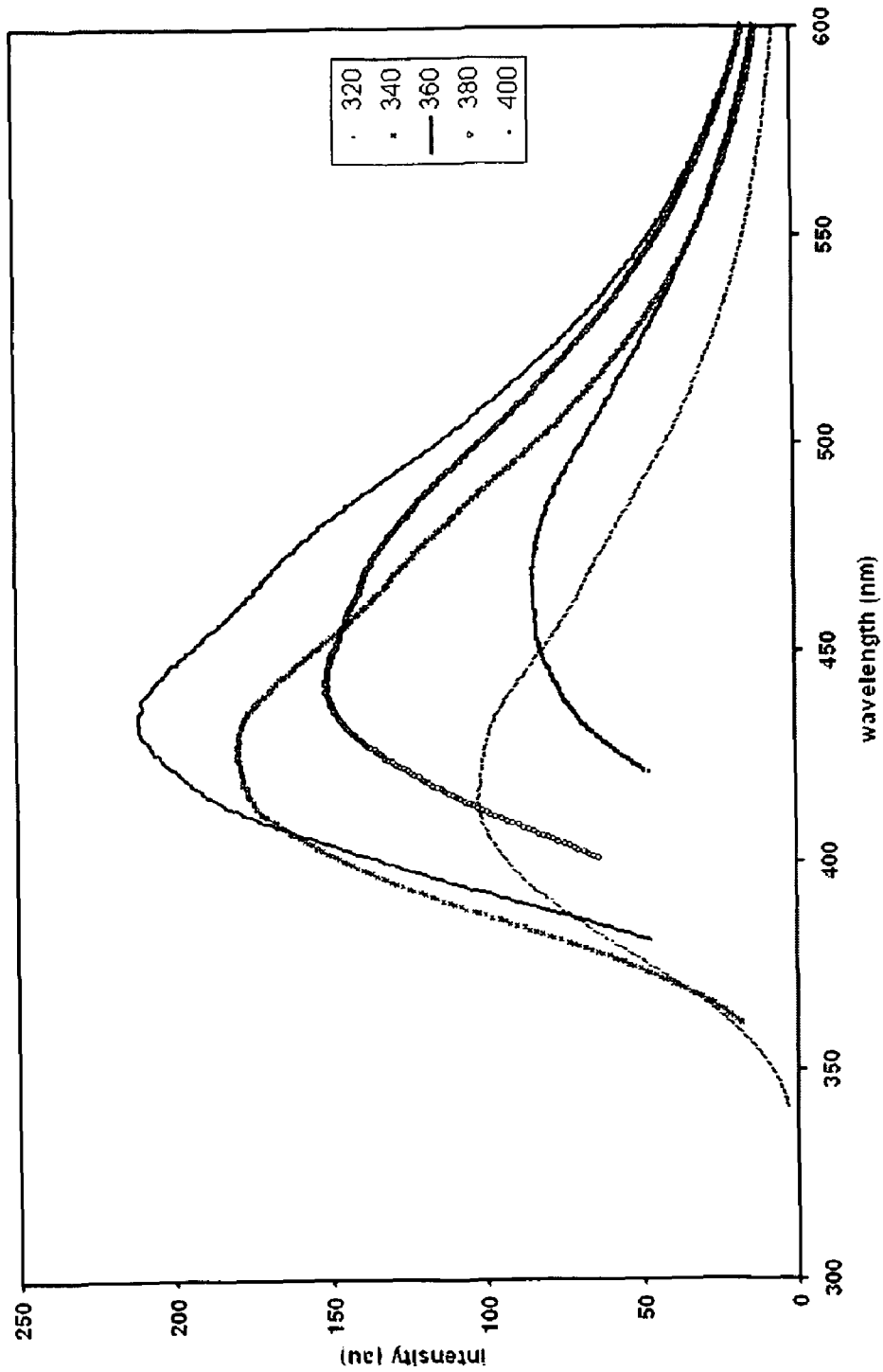
FIG. 8 shows the PL excitation-emission spectrum of alkyl-passivated silicon nanoparticles produced by milling for 8 hours with 1-octyne as the reactive media. The particles exhibit an excitation peak at around 327 nm (not shown in FIG. 8), and an emission peak at around 405 nm. The emission maximum of 405 nm and the resulting Stokes shift of 78 nm is indicative of extremely small crystallite and particle sizes, providing evidence of a large population of nano-sized particles in solution.

The optical properties of the alkyl-passivated silicon nanoparticles were investigated at room temperature. FIG. 8 shows the PL excitation-emission spectrum of alkyl-passivated silicon nanoparticles produced by milling for 8 hours with 1-octyne as the reactive media. The particles exhibit an excitation peak at around 327 nm, and an emission peak at around 405 nm. The emission maximum of 405 nm and the resulting Stokes shift of 78 nm is indicative of extremely small crystallite and particle sizes, providing evidence of a large population of nano-sized particles in solution. Furthermore, the silicon nanoparticles have shown to be thermally stable, maintaining their PL for months after preparation. The quantum yield of the particles has been shown to be 60 percent.

Synthesis and Size Separation of Germanium Nanoparticles

Production of Germanium Nanoparticles:

0.75 g of millimeter sized pieces of germanium of 99.999% purity obtained from Sigma-Aldrich were placed in a stainless steel milling vial along with two stainless steel milling balls, each with a diameter of 1.2 cm and weighing approximately 8.1 g. In a nitrogen-filled glovebox, the vial was loaded, filled with approximately 20 mL of trimethylsilylacetylene ($\geq$98% purity), and then tightly sealed. After charging and sealing, the milling vial was placed in a SPEX 8000-D Dual Mixer/Mill, and high energy ball milling was performed. After 24 hours of milling, the reaction mixture was centrifuged to remove larger particles. The supernatant liquid contains a solution of TMSA passivated germanium nanoparticles. A small amount of methylene chloride was used to further extract soluble particles from the milling residue. All solvent was removed by rotary-evaporation from the combined liquid extracts to yield a dry nanoparticle product. This nanoparticle product may be redispersed in many organic solvents including methylene chloride and hexane.

Characterization:

The crude nanoparticle solution contains different sizes of nanoparticles. The size separation of nanoparticles was done by gel permeation chromatography (GPC). A small amount of concentrated nanoparticle extract was placed on a gravity column consisting of 200 mesh Bio-Beads S-X1, (Bio-Rad). The nanoparticles were size separated using methylene chloride as an elution solvent. Separate fractions (1.5 ml) were collected and used for characterization. For this example, 12 different fractions were collected with the earlier fractions containing the larger nanoparticles and the later fractions containing the smaller nanoparticles.

FTIR spectra were obtained at 1 $cm^{-1}$ resolution with 1000 scans using a Bruker IFS-55 spectrometer. TEM images were taken with a JEOL 2011 TEM using an accelerating voltage of 200 kV. EDS data were obtained in the TEM using an Oxford Inca attachment, using a 3 nm beam spot. NMR spectra were obtained on a Bruker Avance 300 MHz high resolution NMR spectrometer. The excitation-emission spectra and photoluminescence data from the nanoparticles were obtained using a Varian Cary Eclipse spectrofluorimeter. Particles were dissolved in spectral grade hexane, and UV-Visible absorbance peaks obtained on a Cary 50 spectrophotometer provided reference peaks for the initial excitation wavelengths used during PL analysis.

Figure 9:
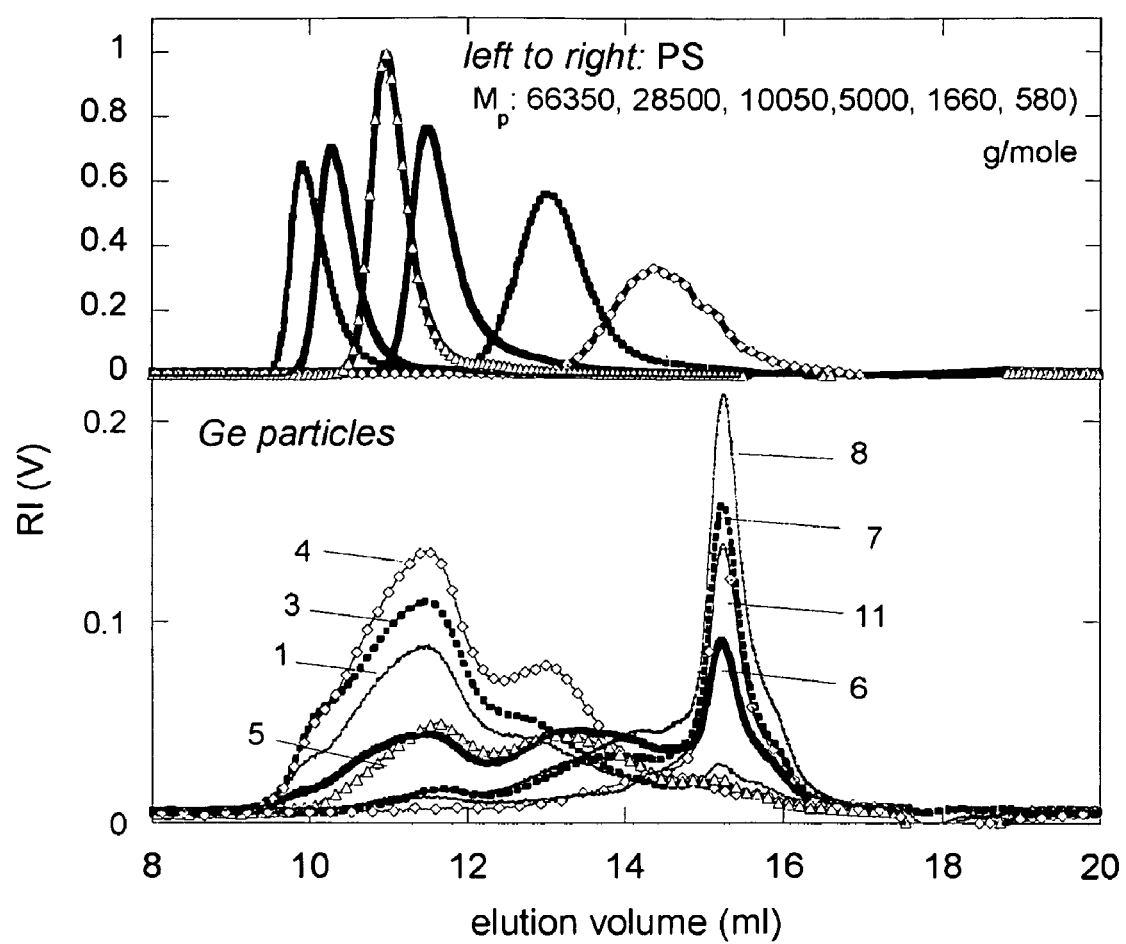
FIG. 9 shows size exclusion chromatography of size separated germanium nanoparticles (selected fractions) in THF solvent and comparison to polystyrene standards.
Figure 10:
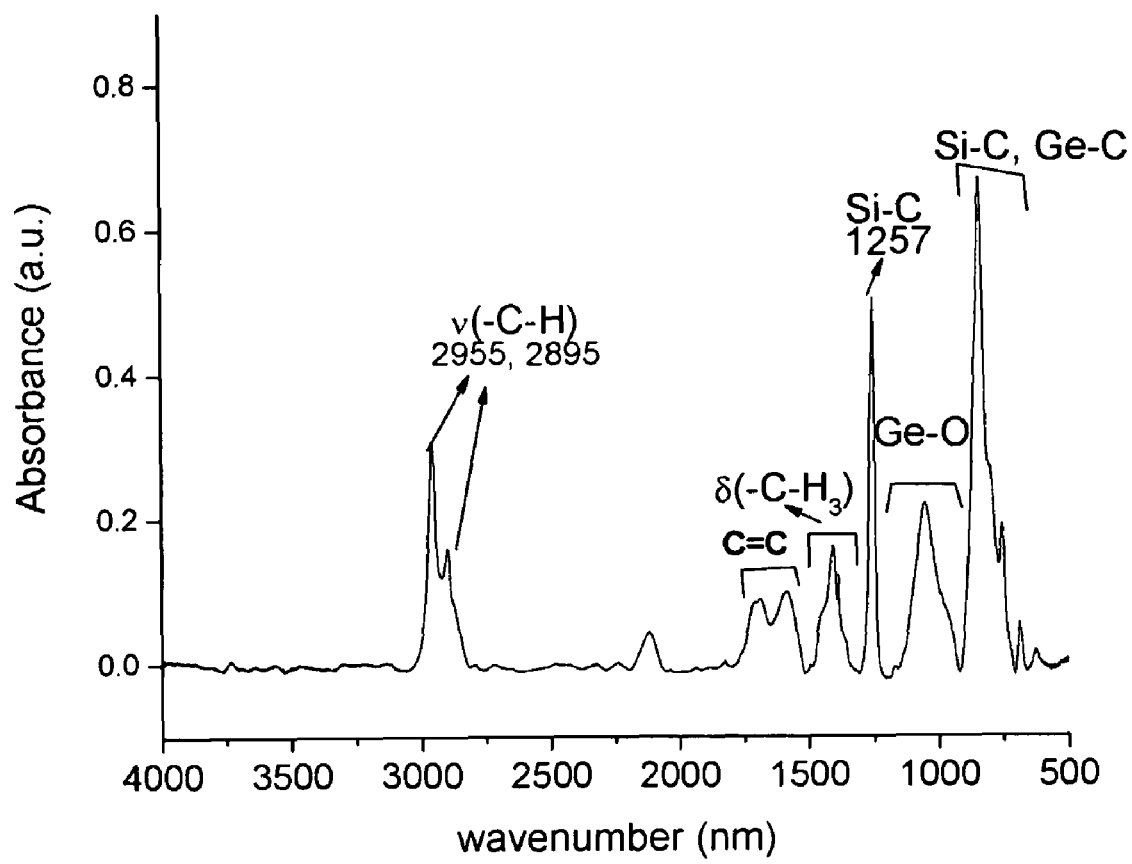
FIG. 10 shows a FT-IR spectrum of a specific fraction (Fraction 4) of size separated germanium nanoparticles with spectral assignments attributed to the organic surface layer.
Figure 11:
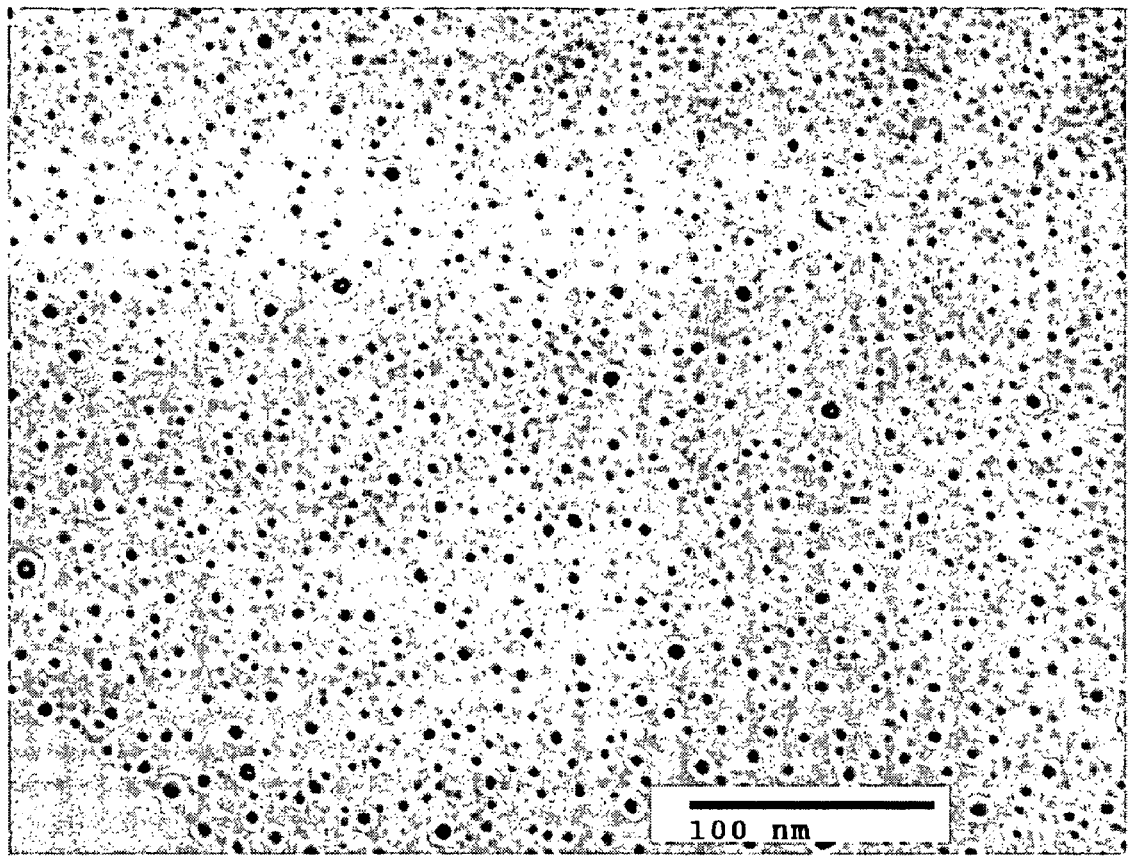
FIG. 11 is a transmission electron micrograph of a narrow size distribution of germanium nanoparticles from Fraction 6.
Figure 12:
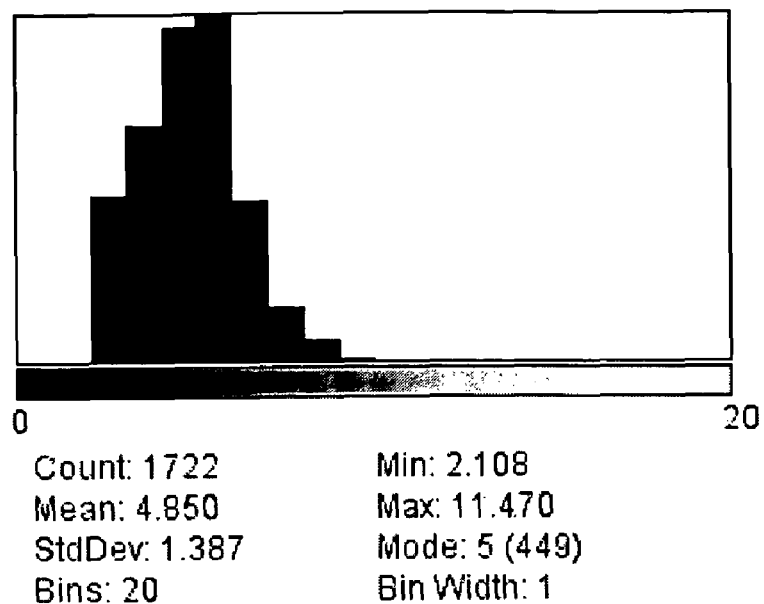
FIG. 12 is a histogram showing quantitatively the size distribution of germanium nanoparticles in Fraction 6.
Figure 13:
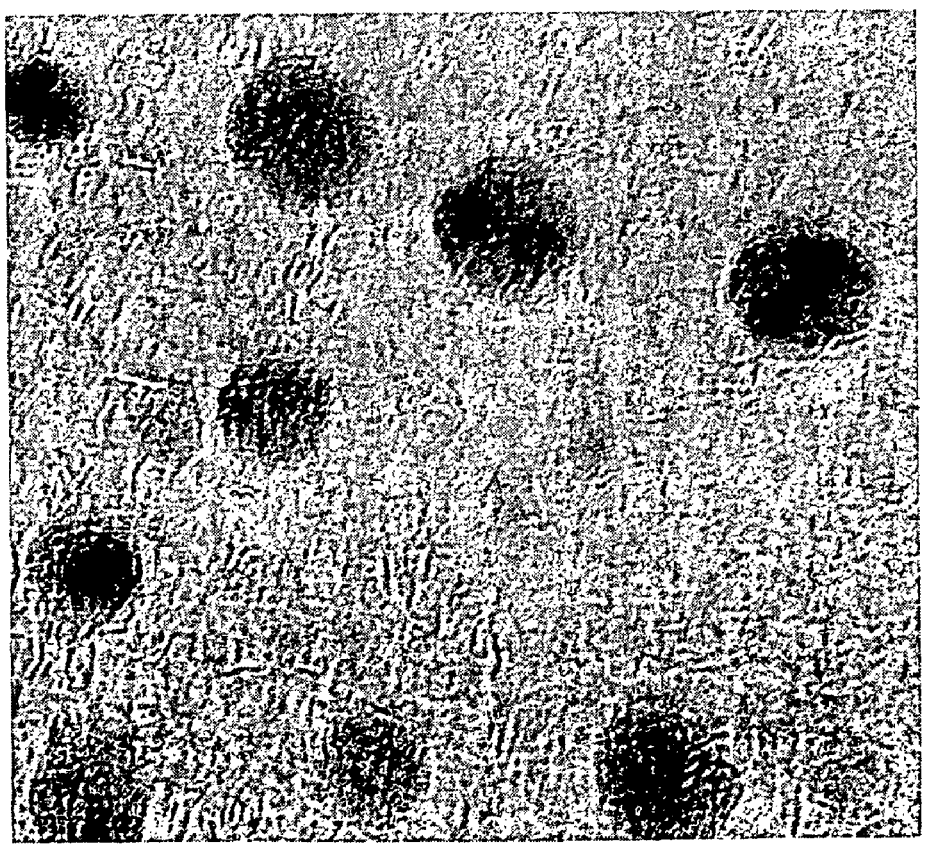
FIG. 13 is a high resolution transmission electron micrograph of fraction 6 showing approximately 5 nm germanium nanoparticles.
Figure 14:
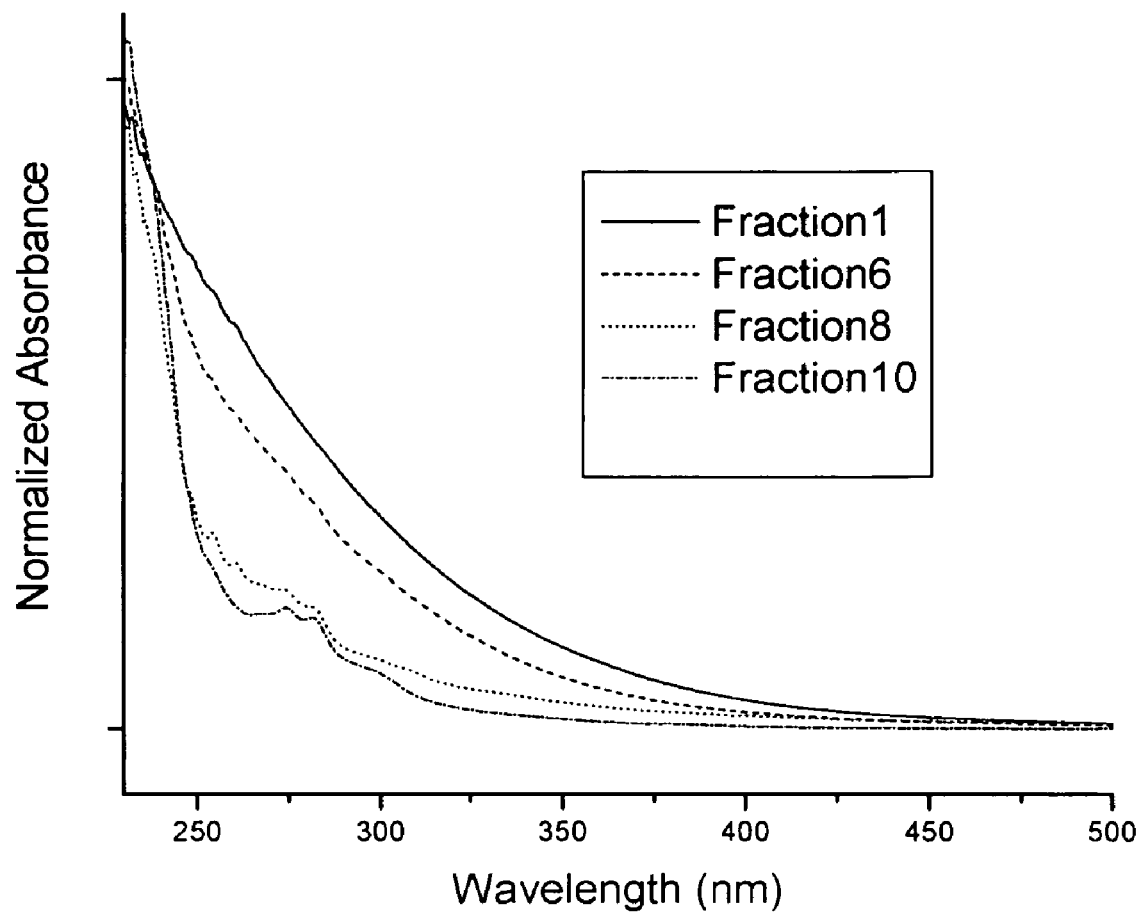
FIG. 14 shows optical absorption spectra of different fractions of germanium nanoparticles.
Figure 15:
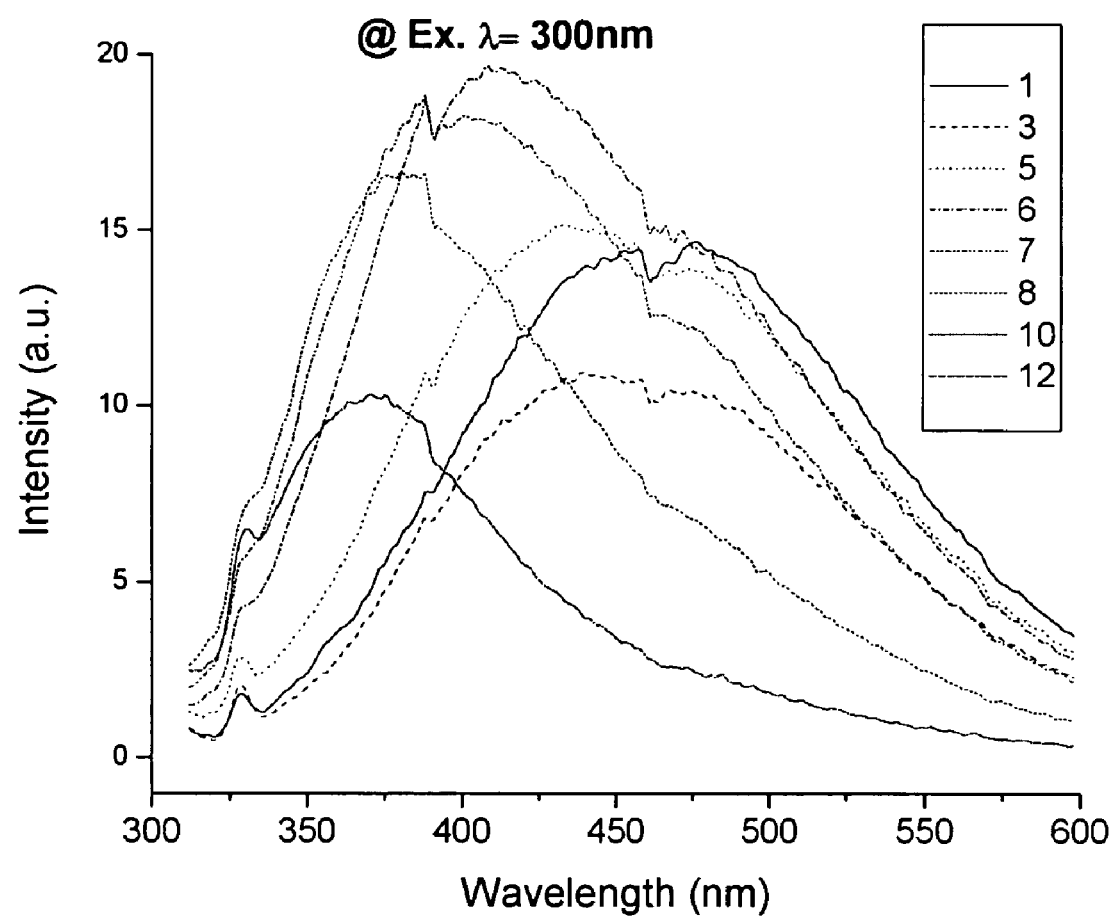
FIG. 15 shows photoluminescence spectra of various fractions of germanium nanoparticles.

FIG. 9 shows size exclusion chromatography of size separated germanium nanoparticles (Fractions 1, 3-8, and 11) in THF solvent and comparison to polystyrene standards. The sharp peak at approximately 500 amu corresponds to a molecular side-product. Most nanoparticles range between 1500-70,000 amu. FIG. 10 shows a FT-IR spectrum of a specific fraction (Fraction 4) of size separated germanium nanoparticles with spectral assignments attributed to the organic surface layer. FIG. 11 is a transmission electron micrograph of a narrow size distribution of germanium nanoparticles from Fraction 6. FIG. 12 is a histogram showing quantitatively the size distribution of germanium nanoparticles in Fraction 6. The average diameter of the nanoparticles is 4.9 nm. FIG. 13 is a high resolution transmission electron micrograph of fraction 6 showing approximately 5 nm germanium nanoparticles. The lattice fringes are clearly visible on the particles indicating that they are single crystal. FIG. 14 shows optical absorption spectra of different fractions of germanium nanoparticles. Early fractions (larger particles) show a more pronounced tailing to longer wavelengths. FIG. 15 shows photoluminescence spectra of various fractions of germanium nanoparticles. Later fractions (smaller particles) show higher energy (shorter wavelength) luminescence in accordance to quantum size effects.

Synthesis of Water Soluble Germanium Nanoparticles

Production of Germanium Nanoparticles:

0.75 g of millimeter sized pieces of germanium of 99.999% purity obtained from Sigma-Aldrich were placed in a stainless steel milling vial along with two stainless steel milling balls, each with a diameter of 1.2 cm and weighing approximately 8.1 g. In a nitrogen-filled glovebox, the stainless steel milling vial was then filled with approximately 20 mL of 3-dimethylamino-1-propyne (Sigma-Aldrich, 98% purity), and then tightly sealed. The milling vial was then placed in a SPEX 8000-D Dual Mixer/Mill, and high-energy ball milling was performed for various lengths of time.

Separation: After 24 hours of milling, the reaction mixture was centrifuged to remove larger particles. The solution contained dimethylamino-1-propyne pas sivated germanium nanoparticles which are soluble. The 3-dimethylamino-1-propyne was removed by rotary-evaporation to yield solid nanoparticles. Approximately 20 ml of distilled water was added to the vial to further dissolve remaining nanoparticles from the residue. The water was removed from this fraction by rotary-evaporation to obtain a second batch of dry nanoparticle product. This nanoparticle product is soluble in water, methanol or other polar solvents and can be redispersed in those solvents for characterization.

Characterization: FTIR spectra were obtained at 1 cm$^{-1}$ resolution with 1000 scans using a Bruker IFS-55 spectrometer. TEM images were taken with a JEOL 2011 TEM using an accelerating voltage of 200 kV. EDS data were obtained in the TEM using an Oxford Inca attachment, using a 3 nm beam spot. NMR spectra were obtained on a Bruker Avance 300 MHz high resolution NMR spectrometer. The excitation-emission spectra and photoluminescence data from the nanoparticles were obtained using a Varian Cary Eclipse spectrofluorimeter. Particles were dissolved in distilled water, and UV-Visible absorbance peaks obtained on a Cary 50 spectrophotometer provided reference peaks for the initial excitation wavelengths used during PL analysis.

Figure 16:
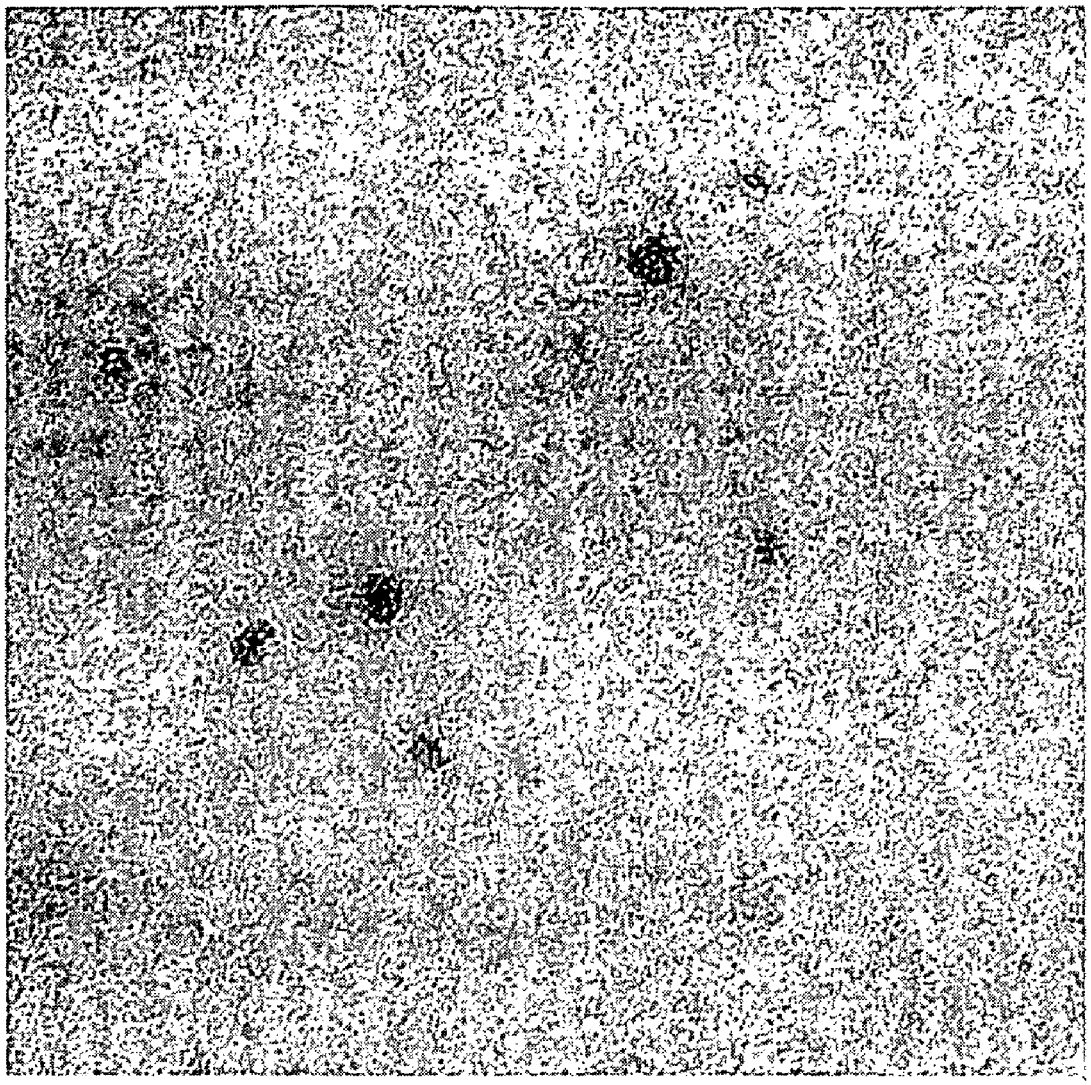
FIG. 16 is a low magnification TEM Image of water-soluble germanium nanoparticles featuring larger nanoparticles.
Figure 17:
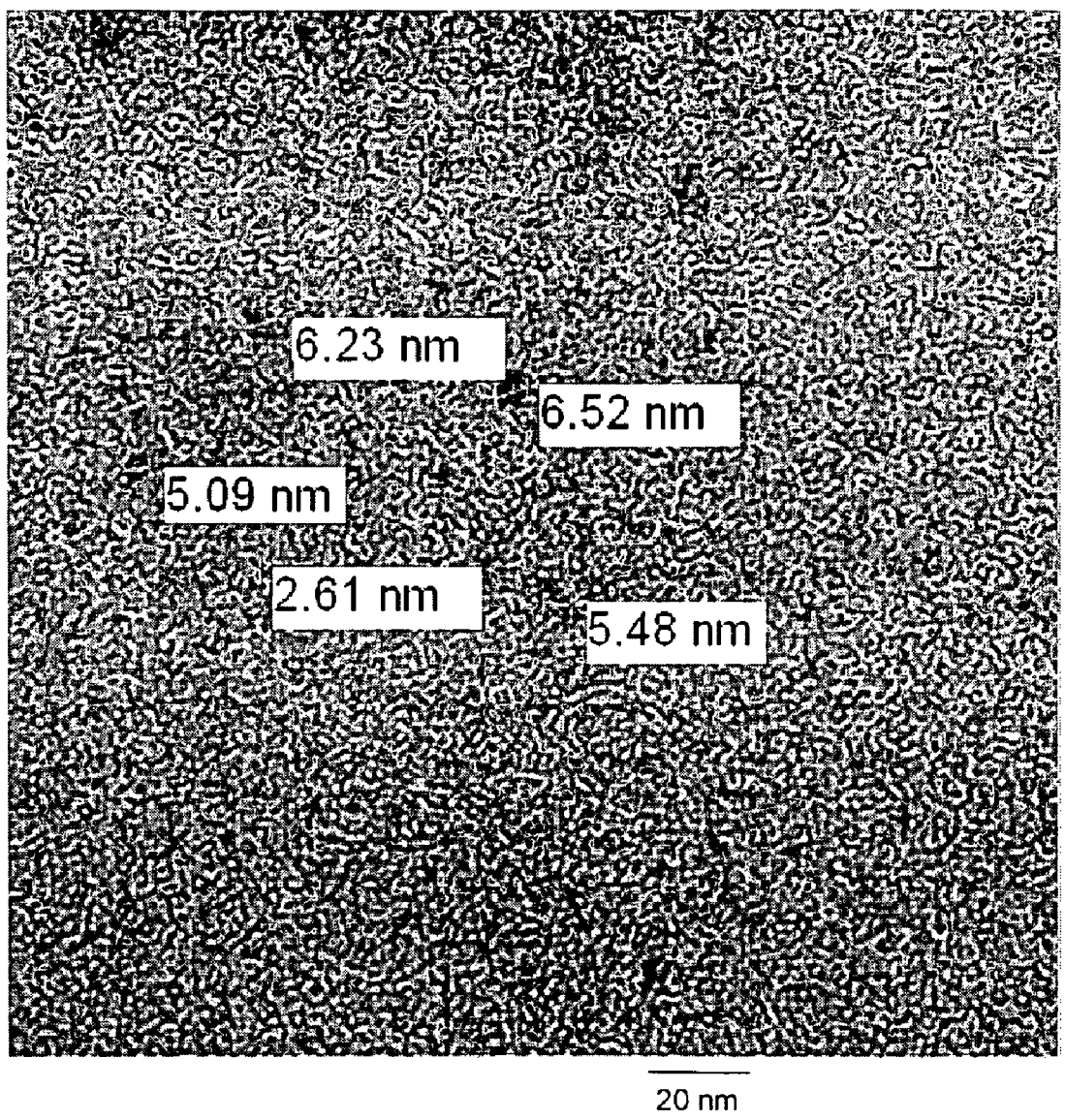
FIG. 17 is a higher magnification image of germanium nanoparticles showing the size of many of the smaller particles.
Figure 18:
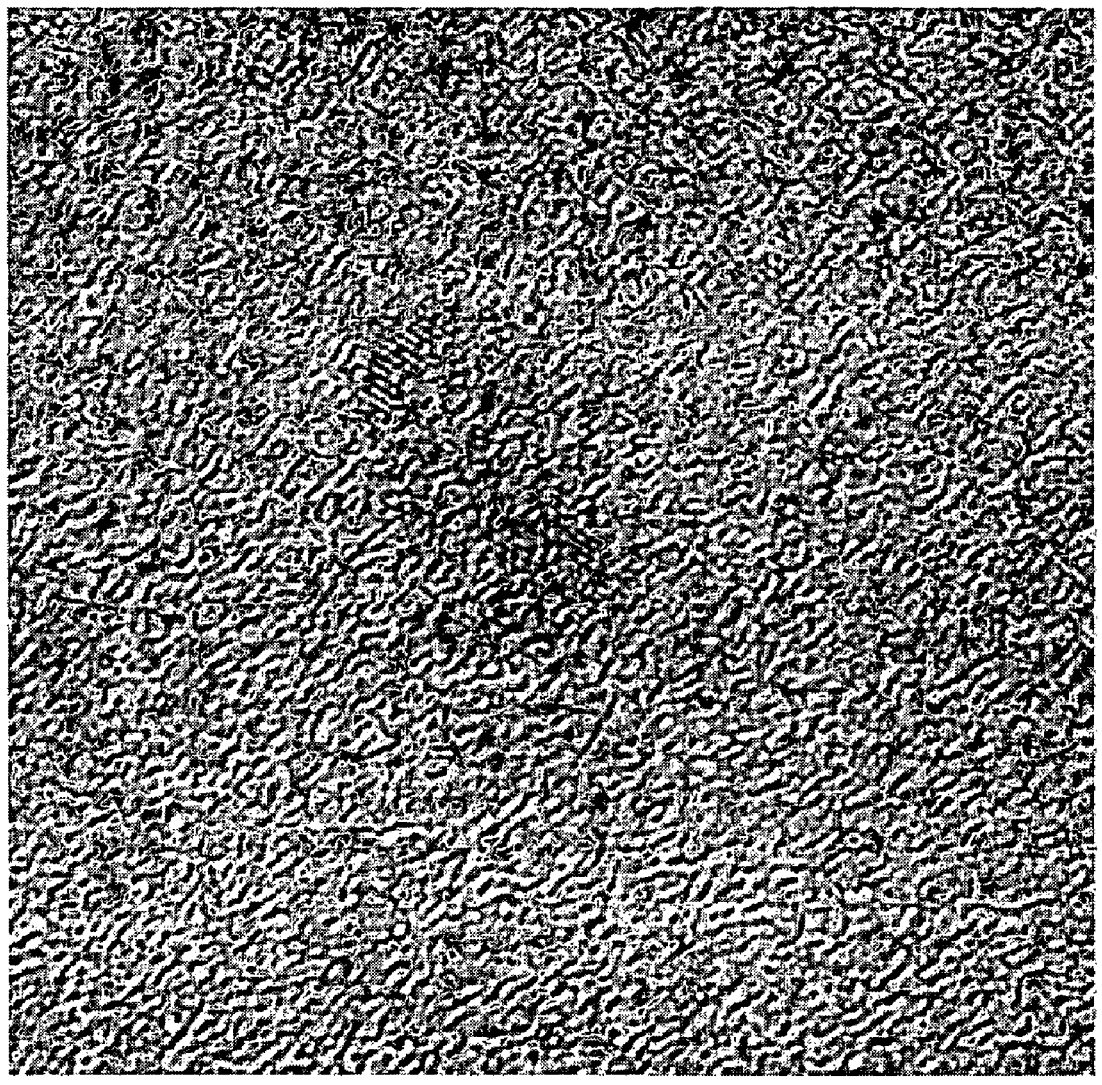
FIG. 18 is a high resolution image of a single nanoparticle.
Figure 19:
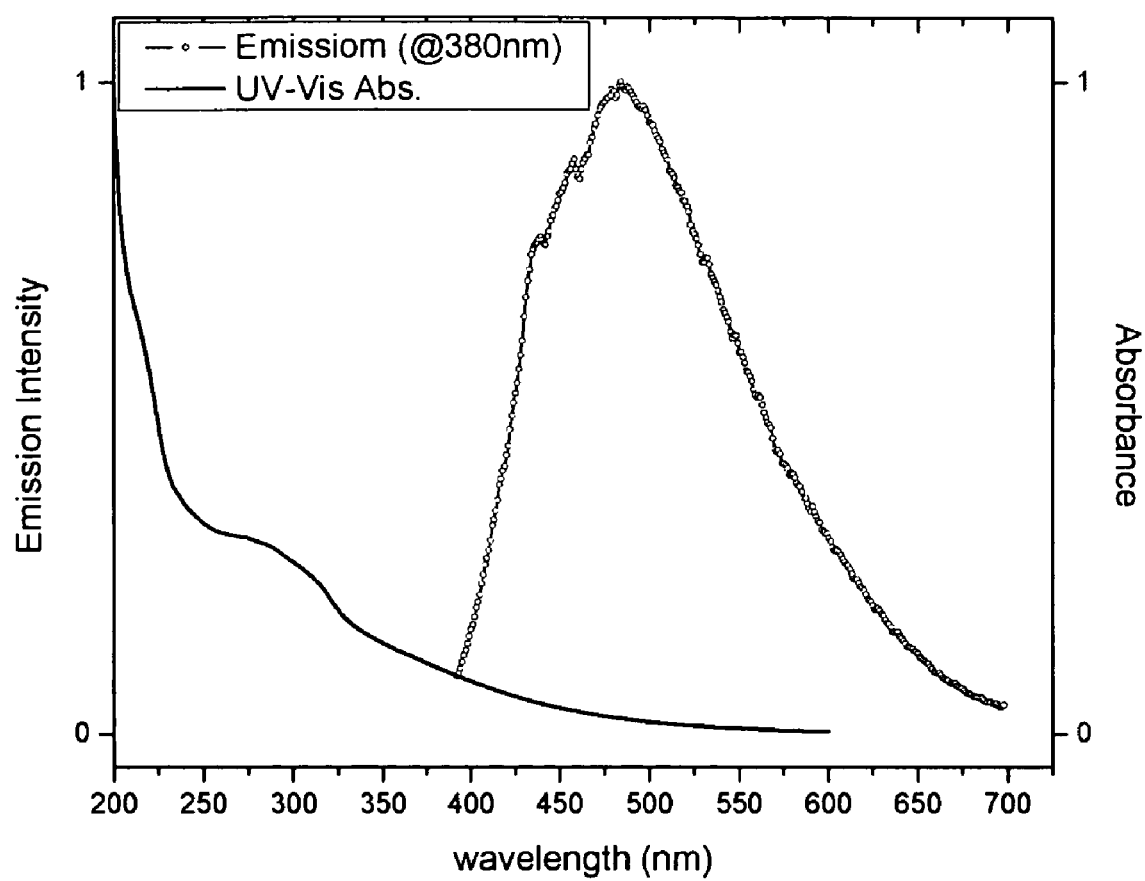
FIG. 19 is a UV-Vis absorbance and photoluminescence spectra of germanium nanoparticles in water.

FIG. 16 is a low magnification TEM Image of water-soluble germanium nanoparticles featuring larger nanoparticles. FIG. 17 is a higher magnification image of germanium nanoparticles showing the size of many of the smaller particles. FIG. 18 is a high resolution image of a single nanoparticle. The lattice fringes of this particle indicate that it is single crystal. FIG. 19 is a UV-Vis absorbance and photoluminescence spectra of germanium nanoparticles in water.

Recently, the present inventors published a new method for the simultaneous production of silicon nanoparticles and the chemical passivation of the particle surface by alkyl/alkenyl groups covalently linked through Si—C bonds (A. S. Heintz, M. J. Fink, B. S. Mitchell. *Adv. Mater.* 2007, 19, 3984—published after our U.S. provisional patent application No. 60/932,428 was filed). By subjecting chunks of single-crystal silicon to high energy ball milling (HEBM) in the presence of a reactive alkyne, the nanoparticle surface underwent a direct reaction, successfully passivating the surface while the particles were simultaneously reduced into the nano-domain by repeated material fracture. The previously presented method is not limited to alkynes, and is in fact applicable to other reactive organics as well. Specifically, aldehydes, carboxylic acids, alkenes, and alcohols were investigated by performing the milling process with 1-octene, 1-octaldehyde, octanoic acid, and 1-octanol as the respective reactive organic liquids during milling. Because the previously presented work was done with 1-octyne, the 8-carbon chain species of each functional group were selected for the purpose of consistency and for ease of comparison. The present inventors have subsequently experimented as well with other carbon chain species.

As before, a stainless steel milling vial is loaded under inert atmosphere with chunks of single-crystal silicon and the reactive organic liquid of choice. Stainless steel milling balls are added to the vial, which is then sealed and subjected to HEBM. Ongoing ball-ball and ball-wall impacts during milling impart mechanical energy into the system, and silicon pieces trapped in these collisions fracture, reducing particle size and creating fresh surface. This newly created surface is highly reactive and provides sites for direct reaction between the silicon and the reactive organic, resulting in the formation of covalent bonds. As HEBM continues, silicon particle sizes are reduced into the nano-domain via comminution, and the direct surface reaction continues as fresh surface is continually produced via facture. In all cases, regardless of the reactive media, milling is preferably performed for a continuous period of 24 hours.

Figure 20:
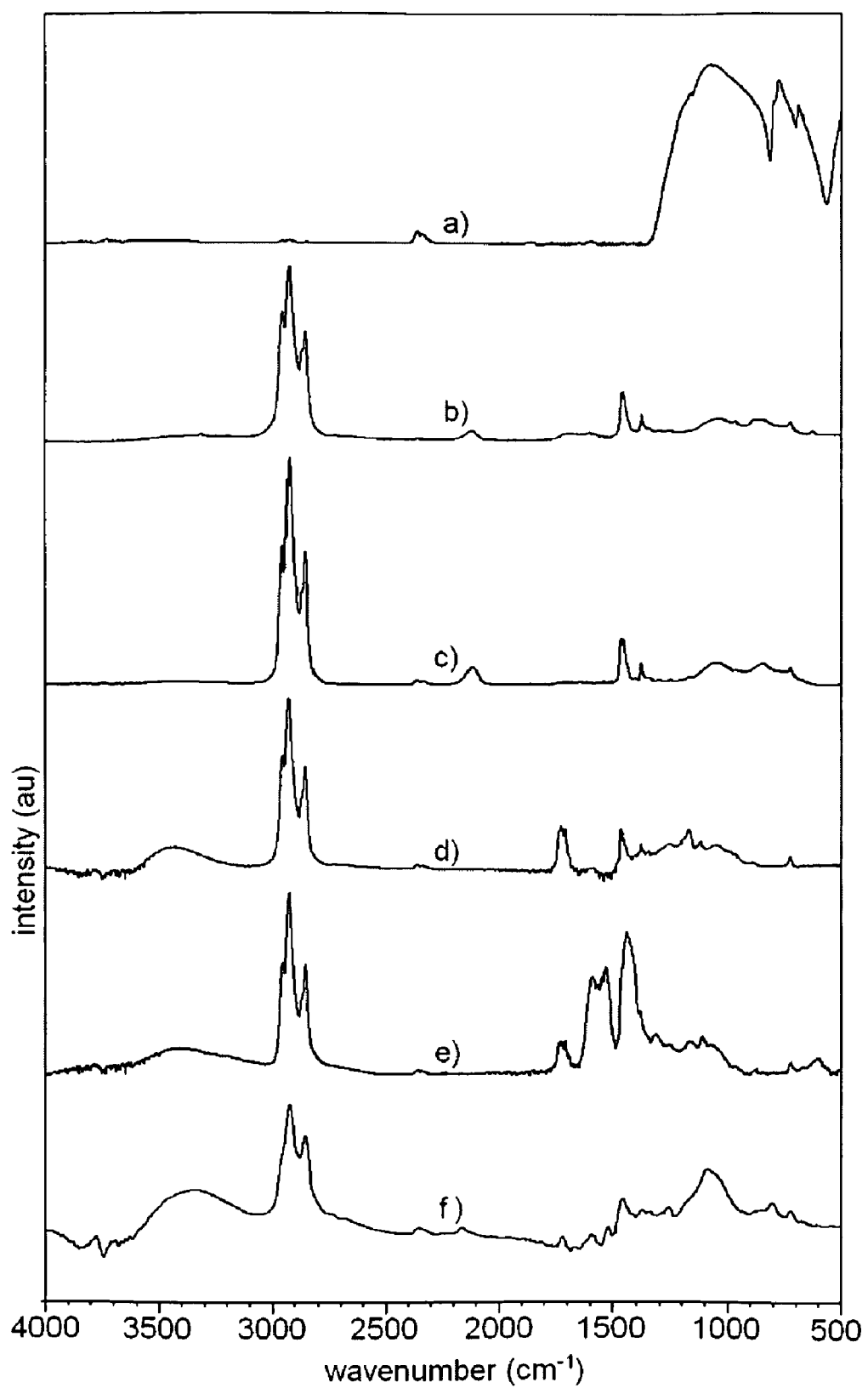
FIG. 20 shows a) FTIR spectrum of passivated silicon nanoparticles produced by milling in air b) FTIR spectrum of passivated silicon nanoparticles produced by milling in 1-octyne for 24 hours c) FTIR spectrum of passivated silicon nanoparticles produced by milling in 1-octene for 24 hours d) FTIR spectrum of passivated silicon nanoparticles produced by milling in 1-octaldehyde for 24 hours e) FTIR spectrum of passivated silicon nanoparticles produced by milling in octanoic acid for 24 hours f) FTIR spectrum of passivated silicon nanoparticles produced by milling in 1-octanol for 24 hours.

FIG. 20 shows a series of Fourier transform infrared (FTIR) spectra obtained on silicon nanoparticles produced by milling in 1-octyne (spectrum b), 1-octene (spectrum c), 1-octaldehyde (spectrum d), octanoic acid (spectrum e), and 1-octanol (spectrum f). For the purpose of comparison, a FTIR spectrum obtained on nanoparticles formed by milling in air (spectrum a) without the presence of a reactive medium is presented. The nanoparticles formed by milling in air show only one major feature in the prominent Si—O—Si peaks from 900-1200 cm$^{-1}$ range. It is also important to note the lack of this same peak in the other five spectra, showing that milling in the presence of these reactive organics does serve to protect the nanoparticles from significant ambient air oxidation. In all five cases where the nanoparticles were milled in the presence of a reactive organic liquid, the infrared spectra show clear evidence of an organic layer, as evidenced by the distinct C—H stretching bands over the 2800-3000 cm$^{-1}$ range as well as C—H vibrational modes at ~1347 cm$^{-1}$ and ~717 cm$^{-1}$. Additionally, the spectra obtained on the nanoparticles produced in octaldehyde, octanoic acid, and octanol also display —OH stretching over the 3200-3500 cm-1 range, which is thought to be due to oxygen insertion into surface Si—H bonds upon exposure to air. The small aldehyde peaks observed in the octaldehyde and octanoic acid nanoparticle spectra are likely due to residual solvent molecules.

Table 1 lists photoluminescence (PL) data obtained on silicon nanoparticles produced by milling in the various organic solvents for 24 hours. Silicon nanoparticles produced by milling in 1-octene exhibit the highest intensity emission at ~396 nm when excited with 320 nm light. The nanoparticles produced by milling in 1-octaldehyde displayed the highest intensity emission at ~518 nm when excited with 440 nm light. Similarly, silicon nanoparticles produced by milling with octanoic acid had the highest intensity emission at ~522 nm when excited with 440 nm light. The highest intensity emission observed from nanoparticles produced by milling in 1-octanol was in the bottom of the visible region at ~406 nm when excited with 290 nm light. The PL properties of silicon nanoparticles produced in 1-octyne are listed for comparison purposes.

TABLE 1

PL data obtained on luminescent silicon nanoparticles produced by milling in various organic solvents for 24 hours

| Passivating Molecule Functional Group | Excitation wavelength of maximum observed emission intensity (nm) | Wavelength of maximum observed emission (nm) | Intensity of maxiumum emission (a.u.) |
|---|---|---|---|
| 1-octyne | 360 | ~435 | ~210 |
| 1-octene | 320 | ~394 | ~72 |
| 1-octaldehyde | 440 | ~522 | ~48 |
| octanoic acid | 440 | ~518 | ~21 |
| 1-octanol | 290 | ~406 | ~12 |

Figure 21:
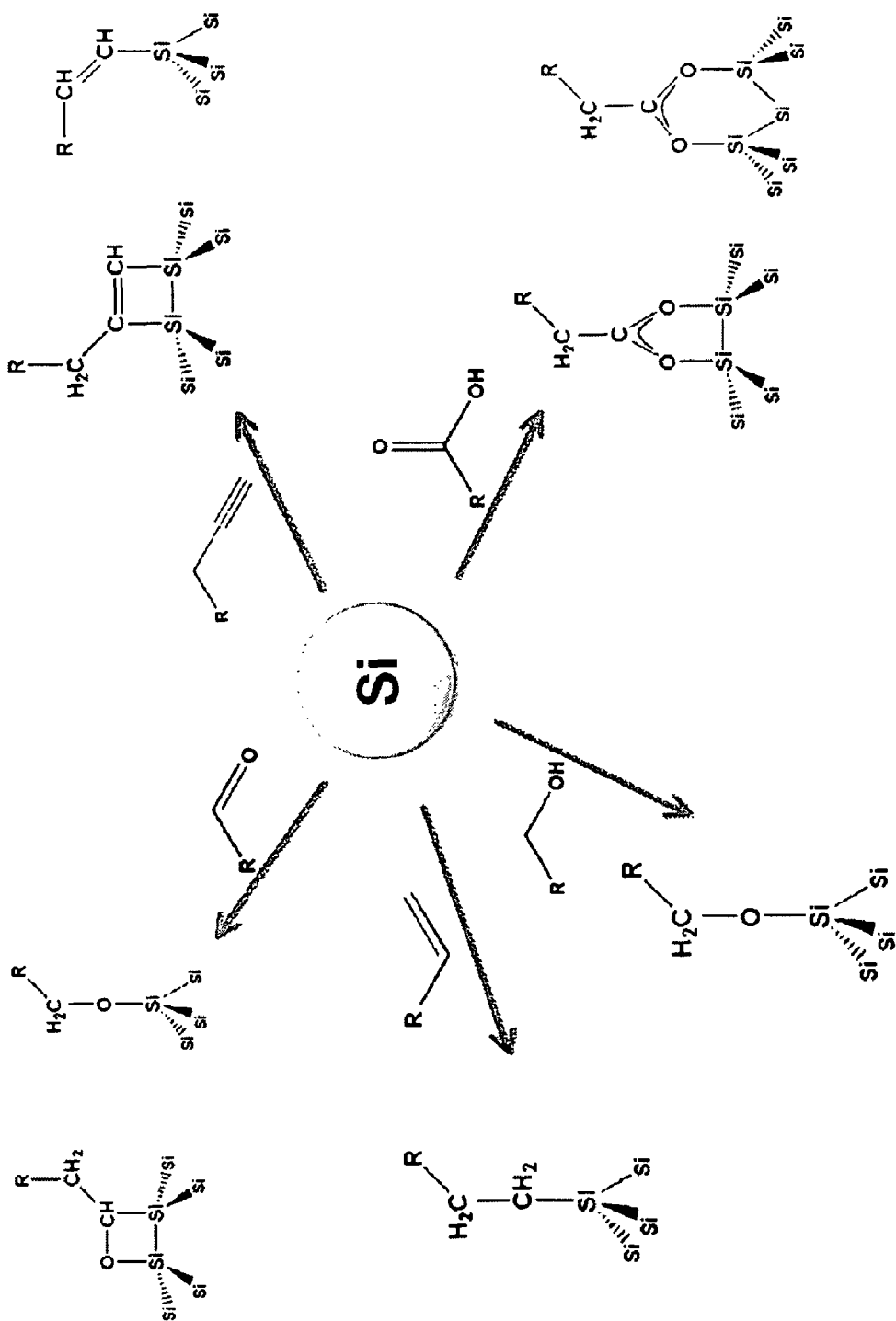
FIG. 21 shows the resulting structures of silicon nanoparticle surface-bound 1-octyne, 1-octene, 1-octaldehyde, octanoic acid, and 1-octanol.

Reactive sites on bare unreacted silicon are well characterized on reconstructed silicon surfaces under ultra high vacuum conditions. Rolls of reactive Si=Si dimers and surface radicals are thought to be the pathway through which the direct reactions occur. As such, it is possible to determine the structures of the surface bound organic monolayer. Using $^{13}C$ and $^1H$ nuclear magnetic resonance (NMR) spectroscopy and the series of multipulse DEPT tests, the resulting structures of nanoparticle surface bound 1-octene, 1-octaldehyde, octanoic acid, and 1-octanol were characterized, and are summarized in FIG. 21. For comparison purposes, the previously deduced surface-bound structure for 1-octyne is also shown.

The present inventors have demonstrated herein that their previously reported method for the simultaneous production and passivation of silicon nanoparticles is not limited merely to alkynes, but in fact is also effective with alkenes, aldehydes, carboxylic acids, and alcohols. Nanoparticles produced in the presence of the discussed reactive organic liquids have shown to fluoresce under UV light, indicating both sufficient reduction in size and successful surface passivation with the reactive molecule. Establishing this one-step direct reaction method as being flexible to various functionalities serves to increase its potential applications.

Experimental

Production of Silicon Nanoparticles: 1.0 g of silicon pieces of 99.95% purity obtained from Sigma-Aldrich were placed in a stainless steel milling vial along with two stainless steel milling balls, each with a diameter of 1.2 cm and weighing approximately 8.1 g. In a glovebox under nitrogen atmosphere, the vial was loaded, filled with approximately 25 mL of the desired liquid media, and then tightly sealed. For reactive media, 1-octanol≧99% purity, octyl aldehyde≧99% purity, and octanoic acid≧98% purity were all obtained from Sigma-Aldrich. After charging and sealing, the milling vial was placed in a SPEX 8000-D Dual Mixer/Mill, and HEBM was performed over various lengths of time. Characterization: FTIR spectra were obtained at 1 cm$^{-1}$ resolution with 1000 scans using a Bruker IFS-55 spectrometer. For FTIR For analysis, the nanoparticles were placed in a vacuum oven for solvent removal, and were re-dissolved in carbon disulfide then placed on a salt plate where the carbon disulfide was allowed to evaporate. The excitation-emission spectra and photoluminescence data from the nanoparticles were obtained using a Varian Cary Eclipse spectrofluorimeter. Particles were dissolved in heptane, and UV-Visible absorbance peaks obtained on a Cary 50 spectrophotometer provided reference peaks for the initial excitation wavelengths used during PL analysis.

Nanoparticle Solubility

One of the main advantages of the developed production method is that the passivated silicon nanoparticles become solubilized in the liquid milling medium during milling. This allows for easy collection, and facilitates an initial separation of the passivated nanoparticles by size via sedimentation.

Nanoparticle Solubilty vs Passivating Molecule Chain Length

It is well known that for organic molecules, longer chain lengths will generally correspond to increasing intermolecular forces. This phenomenon can be observed through physical properties such a the boiling point of organic liquids; n-dodecane (b.p. 216.2° C.) boils at a higher temperature than does n-decane (b.p. 216.2° C.), which boils at a higher temperature than n-octane (b.p. 216.2° C.), which in turn boils higher than n-hexane (b.p. 216.2° C.), and so on. Intermolecular van der Waals forces are determined, chiefly, by the number of electrons around the molecule and by the surface area of the molecule. Longer (and thus larger) molecules will therefore be subject to greater attractive intermolecular forces than will shorter molecules of the same species.

It follows then that the chain length of the passivating molecule should have an effect on the solubility of passivated silicon nanoparticles within the milling solution. By increasing the chain length of the passivating molecule, the net intermolecular attractive force between the nanoparticle and the liquid will increase; essentially, the nanoparticle becomes more 'solvent-like' as the passivating molecules become larger. The attachment of larger passivating molecules to the nanoparticle surface should allow for the solubilization of larger nanoparticles.

Figure 22:
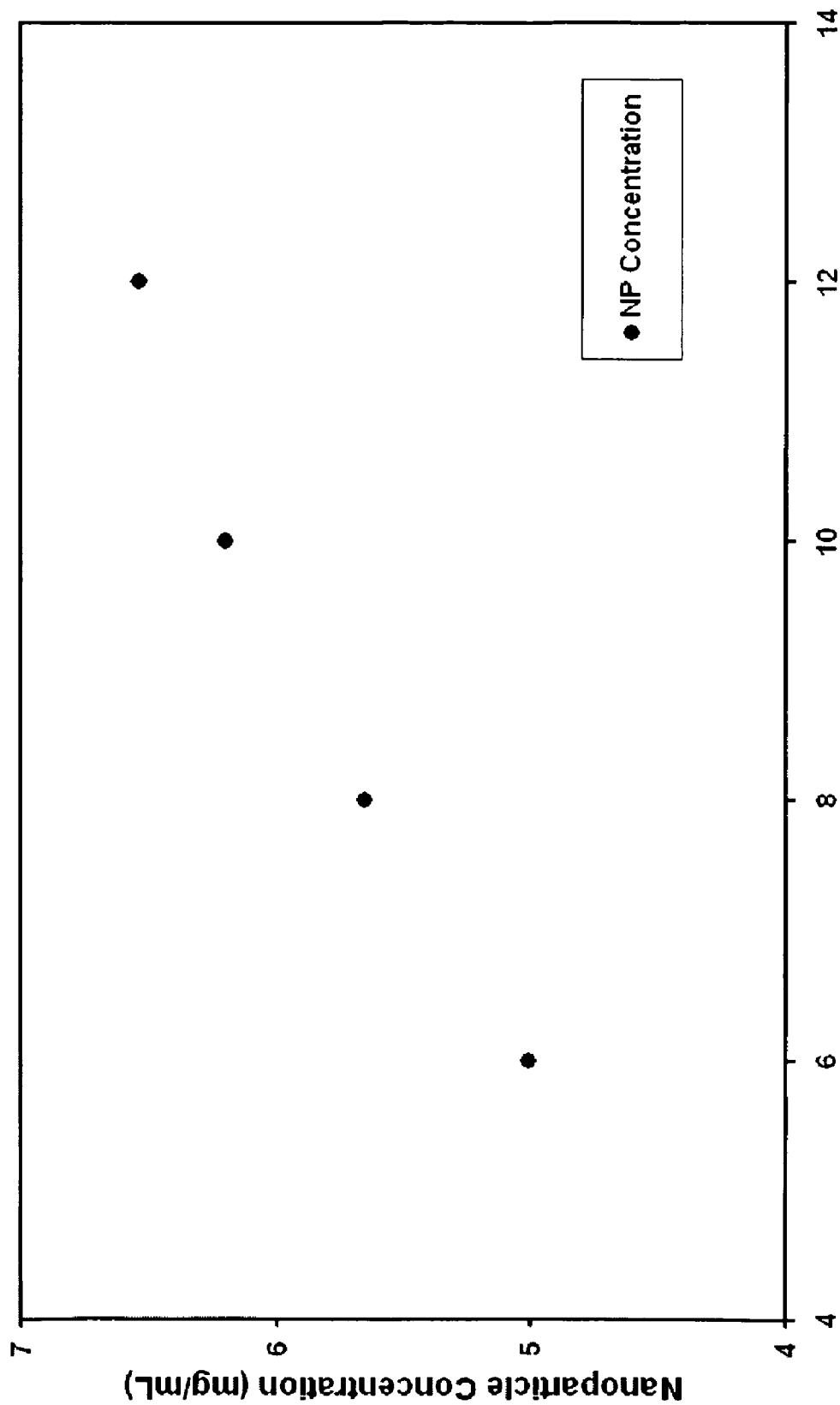
FIG. 22 shows solubilized passivated nanoparticle concentration against the passivating molecule chain length.

FIG. 22 shows the mass concentration in the milling solution of passivated silicon nanoparticles formed by milling in the presence of alkynes of carbon chain lengths of 6, 8, 10, and 12. As the chain length of the reactive liquid molecule increases, the concentration of nanoparticles in solution increases as well. Table 2 lists the process yields for passivated silicon nanoparticles formed by milling in the presence of alkynes of carbon chain lengths of 6, 8, 10, and 12. Yet again, there is an observed increase in the amount of nanoparticles that remain solubilized. Indeed, as the chain length of the passivating molecule is increased, a greater mass of silicon nanoparticles becomes solubilized in the liquid medium.

TABLE 2

Process yields of passivated silicon nanoparticles produced by milling in alkynes of various chain lengths.

| | Chain Length | % Yield |
|---|---|---|
| 1-Hexyne | 6 | 4.10 |
| 1-Octyne | 8 | 4.59 |
| 1-Decyne | 10 | 4.96 |
| 1-Dodecyne | 12 | 5.24 |

~1 g starting Silicon and 20 mL reactive liquid

Figure 23:
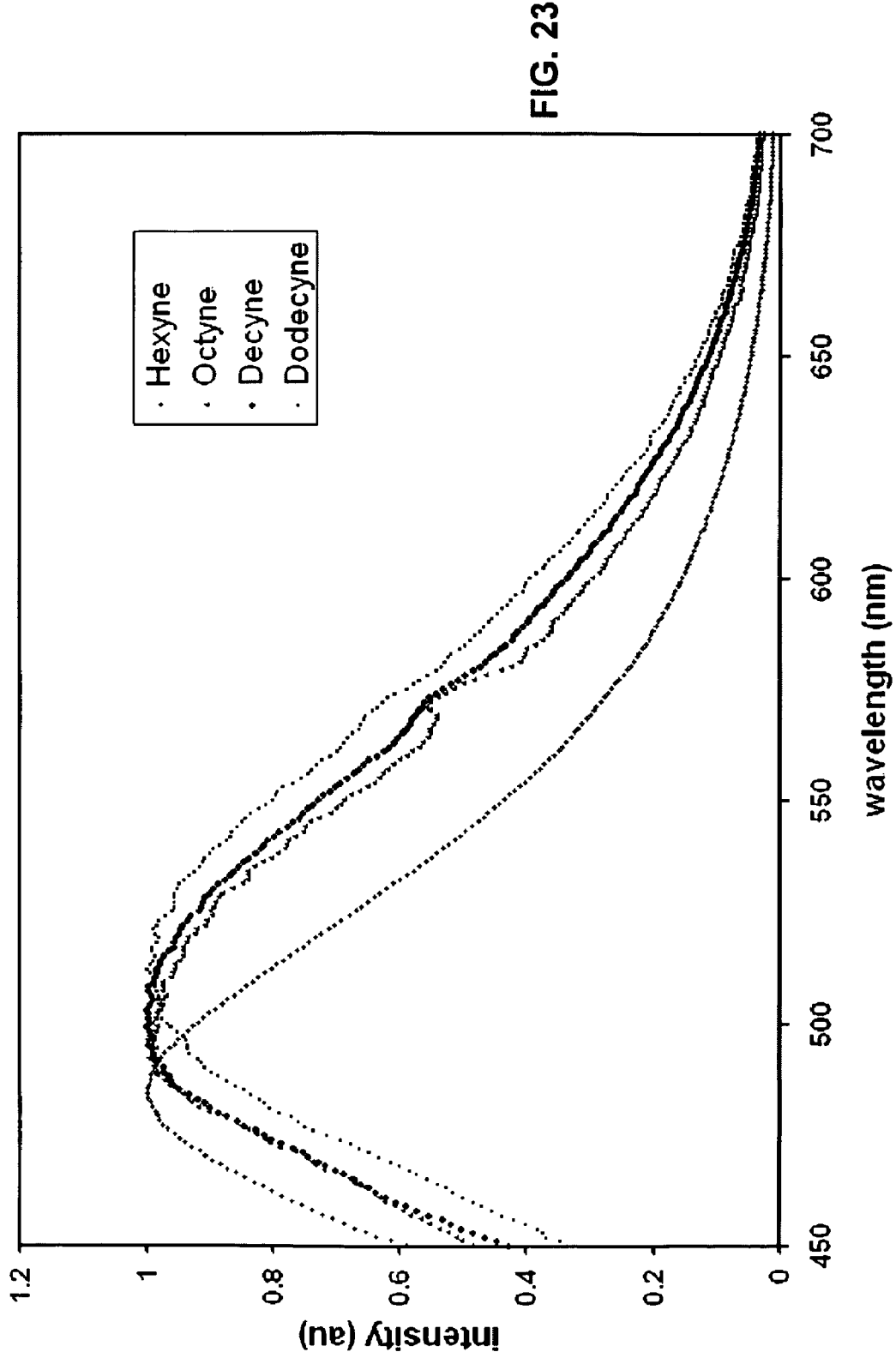
FIG. 23 shows emissions of passivated silicon nanoparticles produced by milling in 1-hexyne (♦), 1-octyne (▲), 1-decyne (●), and 1-dodecyne (■), when excited under 420 nm light.
Figure 24:
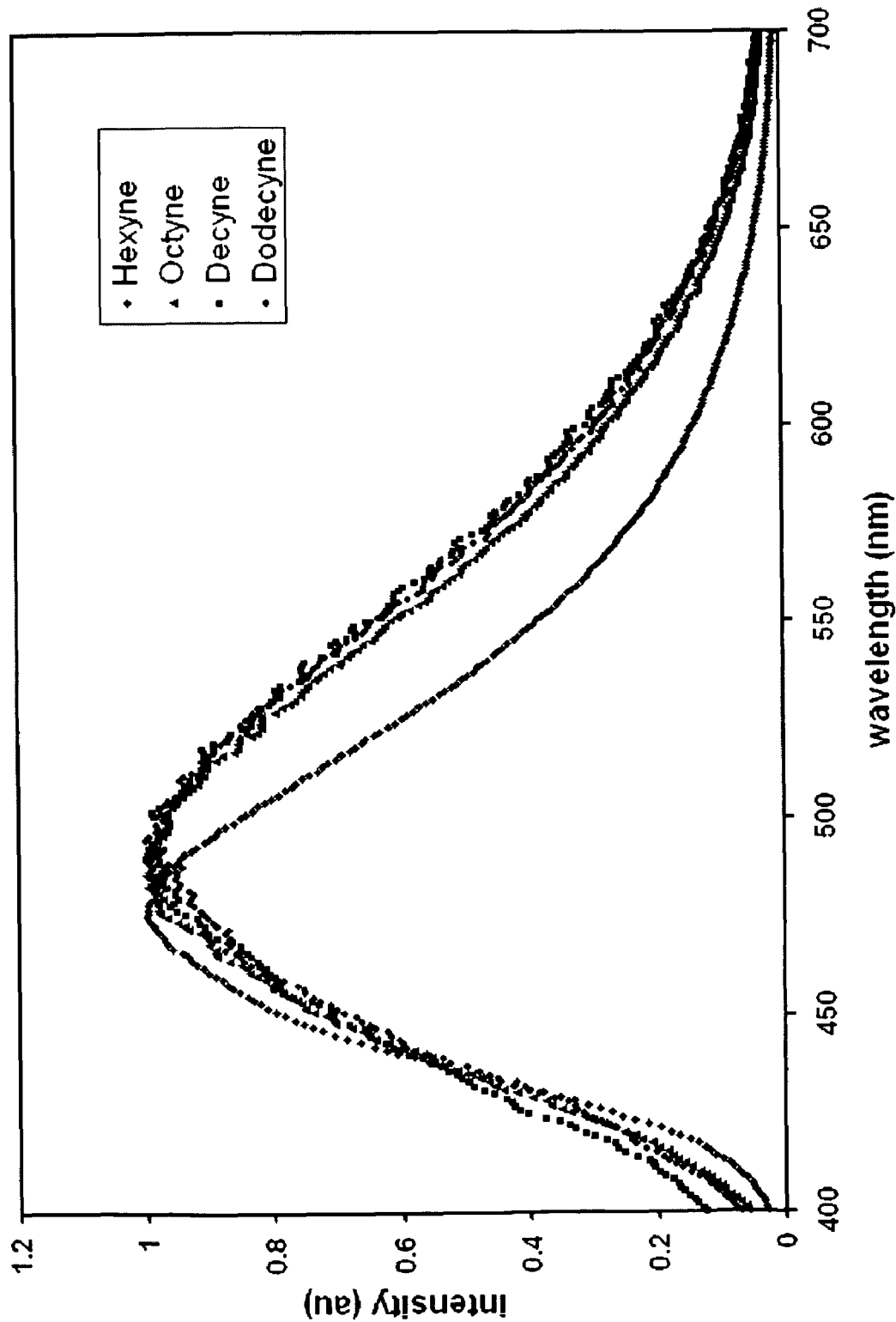
FIG. 24 shows emissions of passivated silicon nanoparticles produced by milling in 1-hexyne (♦), 1-octyne (▲), 1-decyne (●), and 1-dodecyne (■), when excited under 360 nm light.

However, the concentration of nanoparticles within the milling solution as presented above only goes to show a greater overall mass of the solubilized nanoparticles, and speaks nothing of their size. The relation between the size of the solubilized nanoparticles and passivating molecule chain length can be achieved through a comparison of their optical properties. Recall that the bandgap of a silicon nanoparticle is size-dependent; smaller silicon nanoparticles have larger bandgaps, and will thus luminesce at higher energies. FIG. 23 shows the emissions of silicon nanoparticle passivated with alkyl molecules of different chain lengths when excited at 420 nm. For ease of comparison in peak location, the emissions have been normalized to unity. As the length of the passivating molecule is increased, there is an observed red-shift in the emission maximum. As the red-shift denotes an overall decrease in emission energy, this supports the presence of a greater average particle size in the samples with the longer chain length. FIG. 24 shows the emissions of silicon nanoparticle passivated with alkyl molecules of different chain lengths when excited at 360 nm, again normalized to unity. Although narrower emissions are observed due to excitation of the smaller populations, in similar fashion to before a red-shift is observed with increasing passivating molecule chain length.

Chain length variations in the passivating molecule have been shown to affect the size of the passivated silicon nanoparticles that become solubilized in the liquid medium during milling. The attachment of longer chains to the nanoparticle surface results in the solubilization of larger passivated silicon nanoparticles, and conversely, the attachment of shorter chains results in a narrower size distribution. This allows for a certain degree of process tuning, as a limited size selection can be performed by simply altering the reactive organic used during milling.

In one embodiment of the invention, a semiconductor material, such as silicon or germanium, is altered from an indirect band gap semiconductor to a direct band gap semiconductor through high energy ball milling.

In another embodiment of the invention, the reactive medium includes polyfunctionalized nanoparticles that are further reactive in specialized conditions.

In another embodiment of the invention, the high energy ball milling apparatus takes the form of a fluidized bed in which the reactive medium carries the silicon or other material to be comminuted into the fluid bed and in doing so provides momentum to the milling balls, causing them to collide. The passivation process proceeds as previously described, but the nanoparticles are carried out of the fluidized bed in the spent reactive medium.

In another embodiment of the invention, the milling balls are replaced by impactors, which traverse back and forth in an enclosed preferably polymeric vial. The silicon (or other material) fractures in the presence of the reactive medium as previously described, except that collisions are between the impactor and the end surface of the vial. These impactors can be cylindrical and have dimensions of 1 cm in diameter by 3 cm long for example, and be made of any magnetic material such as steel (as the impactors are preferably agitated with electromagnets (the impactors are preferably magnetic because the preferred cryogenic mill (6750 freezer mill produced by SPEX) uses a magnet to make the impactor move back and forth, whereas the SPEX high energy ball mill uses a mechanical motor and swing arm to get the vial moving, the cryomill instead uses magnets to move the impactor)).

In another embodiment of the invention, the passivated silicon nanoparticles are formed in a batch-wise operation.

In another embodiment of the invention, the passivated silicon nanoparticles are formed and removed from the high energy ball milling apparatus in a continuous manner.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of forming stable functionalized nanoparticles, comprising
   a) providing a first material;
   b) providing a reactive medium; and
   c) reducing, in the reactive medium, the first material to particles having dimensions of no greater than 100 nm in size, the reactive medium functionalizing the particles in the first material as the particles are formed to provide stable functionalized nanoparticles.

2. The method of claim 1, wherein ball milling is used to mechanically reduce the first material to nanoparticles.

3. The method of claim 2, wherein the ball milling is a batch operation.

4. The method of claim 2, wherein the ball milling is a continuous operation.

5. The method of claim 1, wherein the particles have dimensions of no greater than 50 nm.

6. The method of claim 1, wherein the particles have dimensions of no greater than 20 nm.

7. The method of claim 1, wherein the particles have dimensions of no greater than 5 nm.

8. The method of claim 1, wherein the reactive medium is pure liquid.

9. The method of claim 1, wherein the reactive medium comprises a solution.

10. The method of claim 1, wherein the first material possesses semiconductive properties.

11. The method of claim 1, wherein the nanoparticles possess phosphorescent and/or fluorescent properties.

12. The method of claim 1, wherein the functionalized nanoparticles exhibit size-dependent quantum confinement effects including photoluminescence.

13. The method of claim 1, wherein the functionalized nanoparticles are soluble in organic solvents, including but not limited to the reactive medium.

14. The method of claim 1, wherein the functionalized nanoparticles are soluble in aqueous systems, including but not limited to the reactive medium.

15. The method of claim 1, wherein the first material is altered from an indirect band gap semiconductor to a direct band gap semiconductor through high energy ball milling.

16. The method of claim 1, wherein the functionalized nanoparticles can be size separated by use of gel permeation chromatography or selective precipitation including but not limited to solvents such as supercritical carbon dioxide.

17. The method of claim 1, wherein the functionalized nanoparticles exhibit covalent linkages between the first material and the reactive medium.

18. A method of mechanochemically making stable functionalized nanoparticles, comprising:
   providing a first material;
   providing a reactive medium;
   repeatedly mechanically impacting the first material in the presence of the reactive medium until a desired quantity of nanoparticles is produced, wherein the reactive medium reacts with the first material as the nanoparticles are produced to functionalize the nanoparticles.

19. A method of forming stable functionalized nanoparticles, comprising
   a) providing a first material;
   b) providing a reactive medium; and c) ball milling said first material in said reactive medium to provide ball milled nanoparticles.

20. A method of forming stable functionalized nanoparticles, comprising
- a) providing a first material;
- b) providing a reactive medium;
- c) ball milling said first material in said reactive medium to provide a fluid phase; and
- d) wherein in step "c" the fluid phase contains nanoparticles.

* * * * *